US010389271B2

(12) United States Patent
Wang et al.

(10) Patent No.: US 10,389,271 B2
(45) Date of Patent: Aug. 20, 2019

(54) SINGLE-PHASE FOUR-LEVEL INVERTER CIRCUIT TOPOLOGY AND THREE-PHASE FOUR-LEVEL INVERTER CIRCUIT TOPOLOGY

(71) Applicants: Hongliang Wang, Hefei (CN); Yan-Fei Liu, Kingston (CA)

(72) Inventors: Hongliang Wang, Hefei (CN); Yan-Fei Liu, Kingston (CA)

( * ) Notice: Subject to any disclaimer, the term of this patent is extended or adjusted under 35 U.S.C. 154(b) by 0 days.

(21) Appl. No.: 15/768,552

(22) PCT Filed: Nov. 7, 2016

(86) PCT No.: PCT/CN2016/104941
§ 371 (c)(1),
(2) Date: Apr. 15, 2018

(87) PCT Pub. No.: WO2017/076367
PCT Pub. Date: May 11, 2017

(65) Prior Publication Data
US 2018/0309384 A1    Oct. 25, 2018

Related U.S. Application Data

(60) Provisional application No. 62/252,122, filed on Nov. 6, 2015.

(51) Int. Cl.
*H02M 7/483* (2007.01)
*H02M 7/487* (2007.01)

(52) U.S. Cl.
CPC ........... *H02M 7/483* (2013.01); *H02M 7/487* (2013.01)

(58) Field of Classification Search
CPC ............ H02M 7/12; H02M 7/42; H02M 7/49; H02M 7/487; H02M 7/537; H02M 3/3155;

(Continued)

(56) References Cited

U.S. PATENT DOCUMENTS 6,700,804 B1 * 3/2004 Reichard ............... H02M 7/487
323/351
8,344,551 B2 * 1/2013 Nielsen .................. H02J 1/102
307/82

(Continued)

OTHER PUBLICATIONS

V. Yaramasu, et al., A New Power Conversion System for Megawatt PMSG Wind Turbines Using Four-Level Converters and a Simple Control Scheme Based on Two-Step Model Predictive Strategy—Part I: Modeling and Theoretical Analysis, IEEE Journal of Emerging and Selected Topics in Power Electronics, 2014, 2:3-13.

(Continued)

*Primary Examiner* — Adolf D Berhane

(57) ABSTRACT

A single-phase four-level inverter circuit topology and a three-phase four-level inverter circuit topology. The single-phase four-level inverter circuit topology is adapted to be used with two series-connected direct current power sources, so as to enable a first direct current power source or a second direct current power source to supply power to a load of the four-level inverter circuit topology, alternatively, any one of two direct current power sources is first algebraically superimposed with a flying capacitor and then supplies the power to the load of the four-level inverter circuit topology (M), thereby making the four-level inverter circuit topology output four different levels. The single-phase and three-phase four-level inverter circuit topologies reduce the system cost and volume by using a flying capacitor, the voltage utilization rate is three times that of the existing four-level inverter circuit topology under the same operating conditions, and the direct current side neutral point voltage can be balanced without requiring additional circuits.

24 Claims, 15 Drawing Sheets

(58) Field of Classification Search
CPC ........ H02M 3/325; H02M 3/335; H02M 3/10;
H02M 1/32; H02H 7/122
See application file for complete search history.

(56) References Cited

U.S. PATENT DOCUMENTS

| | | | | |
|---|---|---|---|---|
| 9,083,230 | B2* | 7/2015 | Narimani | ................ H02M 3/07 |
| 2015/0200602 | A1* | 7/2015 | Narimani | ............ H02M 5/4585 |
| | | | | 363/37 |
| 2015/0311822 | A1* | 10/2015 | Ma | ........................ H02M 7/483 |
| | | | | 363/98 |
| 2017/0099013 | A1* | 4/2017 | Martini | ................ H02M 7/487 |
| 2017/0302195 | A1* | 10/2017 | Ye | ........................ H02M 7/483 |

OTHER PUBLICATIONS

V. Yaramasu, et al., A New Power Conversion System for Megawatt PMSG Wind Turbines Using Four-Level Converters and a Simple Control Scheme Based on Two-Step Model Predictive Strategy—Part II: Simulation and Experimental Analysis, IEEE Journal of Emerging and Selected Topics in Power Electronics, 2014, 2:14-25.

J. Pou, et al., Voltage-balance limits in four-level diode-clamped converters with passive front ends, IEEE Trans. Ind. Electron., 2005, 52:190-196.

A.A. Boora, et al., Voltage-sharing converter to supply single-phase asymmetrical four-level diode-clamped inverter with high power factor loads, IEEE Trans. Power Electron., 2010, 25:2507-2520.

K. Wang, et al., Voltage Balancing Control of a Four-Level Hybrid-Clamped Converter Based on Zero-Sequence Voltage Injection Using Phase-Shifted PWM, IEEE Trans. Power Electron., 2016, 31:5389-5399.

* cited by examiner

SINGLE-PHASE FOUR-LEVEL INVERTER CIRCUIT TOPOLOGY AND THREE-PHASE FOUR-LEVEL INVERTER CIRCUIT TOPOLOGY

This application is a 35 U.S.C. 371 of International Patent Application No. PCT/CN2016/104941, filed on Nov. 7, 2016, and claims the benefit of the filing date of U.S. Application No. 62/252,122, filed on Nov. 6, 2015. The contents of both applications are incorporated herein by reference in their entirety.

FIELD OF THE INVENTION

The invention relates to power converter, especially to four-level inverter topology unit and inverter.

BACKGROUND

An inverter is used to convert DC power into AC power. With the development of technology and the improvement of life quality, inverter especially multilevel inverter has been playing an increasingly important role. There are two kinds of inverters. They are multi-diode clamped inverter and flying capacitor inverter.

Four-level inverter produces four mutually different voltage levels. FIG. 1(a) shows the present multi-diode clamped four-level inverter topology unit and FIG. 1(b) shows the present flying capacitor four-level inverter topology unit. Their voltage utilization ratio is both one. They both need an additional circuit to increase the input voltage when higher output voltage is needed. It is noted that more than two capacitors are connected in series at the input side. Another additional circuit is needed to balance the voltage between these capacitors. These additional circuits reduce the system efficiency and increase the system cost.

SUMMARY

To solve the above problems, provided in the invention is a four-level inverter topology unit and four-level inverter thereof. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

The four-level inverter topology unit is used with a first DC power supply and a second DC power supply. The negative terminal of the first DC power supply is connected to the positive terminal of the second DC power supply. The four-level inverter topology unit outputs four mutually different voltage levels. It at least comprises a floating capacitor and two circuit branches: one is from the first DC power supply to the floating capacitor and the other one is from the second DC power supply to the floating capacitor. The floating capacitor is charged by the two serially connected DC power supplies simultaneously. Either the first DC power supply or the second DC power supply provides power to the load of the four-level inverter topology unit, or the first DC power supply or the second DC power supply alternatively added algebraically to the floating capacitor provides power to the load of the four-level inverter topology unit.

In some implementation, these two DC power supplies are implemented by another DC power supply in parallel with two capacitors connected in series. Each capacitor acts as a DC power supply.

According to a first aspect of the invention, there is provided a first kind of single phase four-level inverter topology unit which outputs four mutually different voltage levels. It comprises a first circuit module and a second circuit module.

The first circuit module comprises a first terminal, a second terminal, a third terminal and a fourth terminal. There is at least one circuit branch between the first terminal and the third terminal, and another circuit branch between the second terminal and the fourth terminal. The first terminal of the first circuit module is connected to the positive terminal of the first DC power supply, and the second terminal of the first circuit module is connected to the negative terminal of the second DC power supply.

In some embodiments, the circuit branch which is connected between the first terminal and the third terminal of the first circuit module or between the second terminal and the fourth terminal of the first circuit module comprises at least one bidirectional switch.

In some embodiments, the first circuit module further comprises a current limiting device, such as an inductor, resistor, semiconductor device operated at active mode or linear mode, or the combination of the above devices. The current limiting device is used to limit the surge current when the floating capacitor is charged. That is, the current limiting device forms part of the charging circuit loop of the floating capacitor.

In some implementation, the current limiting device is comprised of a current-limiting inductor.

The second circuit module comprises a floating capacitor, a first input terminal, a second input terminal, a third input terminal, a fourth input terminal and an output terminal. There is at least one circuit branch between each of the input terminals and the output terminal.

The third terminal of the first circuit module is connected to the third input terminal of the second circuit module and the fourth terminal of the first circuit module is connected to the fourth input terminal of the second circuit module. The first input terminal of the second circuit module is connected to the positive terminal of the first DC power supply and the second input terminal of the second circuit module is connected to the negative terminal of the second DC power supply. The output terminal of the second circuit module is connected to a first terminal of AC utilities or AC load.

The first circuit module provides at least two circuit branches: one circuit branch is connected between the first DC power supply and one input terminal of the second circuit module, and the other is connected between the second DC power supply and another input terminal of the second circuit module. The two circuit branches are extended to the floating capacitor inside of the second circuit module. The floating capacitor is charged by the two serially connected DC power supplies simultaneously. The second circuit module outputs four mutually different voltage levels.

In some embodiments, the first circuit module further comprises a first bidirectional switch, a second bidirectional switch, a first diode and a second diode.

The first terminal of the first bidirectional switch is connected with the first terminal of the first circuit module and the second terminal of the first bidirectional switch is connected with the first terminal of the second bidirectional switch whose second terminal is connected to the second terminal of the first circuit module. The positive terminal of the first diode is connected with the negative terminal of the second diode, and the negative terminal of the first diode is connected with the third terminal of the first circuit module.

The positive terminal of the second diode is connected with the fourth terminal of the first circuit module.

The current-limiting inductor is connected between the first terminal of the second bidirectional switch and the positive terminal of the first diode.

In some embodiments, the first circuit module further comprises a first bidirectional switch, a second bidirectional switch, a third bidirectional switch and a fourth bidirectional switch.

The first terminal of the first bidirectional switch is connected with the first terminal of the first circuit module and the second terminal of the first bidirectional switch is connected with the first terminal of the second bidirectional switch whose second terminal is connected to the second terminal of the first circuit module. The first terminal of the third bidirectional switch is connected with the third terminal of the first circuit module and the second terminal of the third bidirectional switch is connected with the first terminal of the fourth bidirectional switch whose second terminal is connected to the fourth terminal of the first circuit module.

The current-limiting inductor is connected between the first terminal of the second bidirectional switch and the first terminal of the fourth bidirectional switch.

In some embodiments, the first circuit module further comprises a first bidirectional switch, a second bidirectional switch, a third bidirectional switch, a fourth bidirectional switch, a first diode, a second diode, a first current-limiting inductor and a second current-limiting inductor.

The first terminal of the first bidirectional switch is connected with both the first terminal of the first circuit module and a first terminal of the first current-limiting inductor, and the second terminal of the first bidirectional switch is connected with a first terminal of the second current-limiting inductor whose second terminal is connected to the second terminal of the first circuit module. A second terminal of the first current-limiting inductor is connected to the first terminal of the second bidirectional switch whose second terminal is connected to the second terminal of the first circuit module. The first terminal of the third bidirectional switch is connected with the second terminal of the first current-limiting inductor and the second terminal of the third bidirectional switch is connected with the positive terminal of the first diode whose negative terminal is connected to the third terminal of the first circuit module. The second terminal of the fourth bidirectional switch is connected to the first terminal of the second current-limiting inductor and the first terminal of the fourth bidirectional switch is connected to the negative terminal of the second diode whose positive terminal is connected to the fourth terminal of the first circuit module.

In some embodiments, the second circuit module further comprises a first bidirectional switch, a second bidirectional switch, a third bidirectional switch, a fourth bidirectional switch, a fifth bidirectional switch and a sixth bidirectional switch.

The first terminal of the first bidirectional switch is connected to the first input terminal of the second circuit module and the second terminal of the first bidirectional switch is connected to the first terminal of the second bidirectional switch whose second terminal is connected to the second input terminal of the second circuit module. The first terminal of the third bidirectional switch is connected to both the third input terminal of the second circuit module and the positive terminal of the floating capacitor. The second terminal of the third bidirectional switch is connected to the first terminal of the fourth bidirectional switch whose second terminal is connected to both the fourth input terminal of the second circuit module and the negative terminal of the floating capacitor. The common terminal of the third and the fourth bidirectional switches is connected to the common terminal of the first and the second bidirectional switches. The first terminal of the fifth bidirectional switch is connected to the positive terminal of the floating capacitor and the second terminal is connected to the first terminal of the sixth bidirectional switch whose second terminal is connected to the negative terminal of the floating capacitor. The common terminal of the fifth and the sixth bidirectional switches is connected to the output terminal of the second circuit module.

In some embodiments, the second circuit module further comprises a first diode, a second diode, a first bidirectional switch, a second bidirectional switch, a third bidirectional switch, a fourth bidirectional switch, a fifth bidirectional switch and a sixth bidirectional switch.

The first terminal of the first bidirectional switch is connected to the first input terminal of the second circuit module and the second terminal of the first bidirectional switch is connected to both the fourth input terminal of the second circuit module and the negative terminal of the floating capacitor. The first terminal of the second bidirectional switch is connected to both the third input terminal of the second circuit module and the positive terminal of the floating capacitor and the second terminal of the second bidirectional switch is connected to the second input terminal of the second circuit module. The positive terminal of the first diode is connected to the first input terminal of the second circuit module and the negative terminal of the first diode is connected to the first terminal of the third bidirectional switch whose second terminal is connected to both the first terminal of the fourth bidirectional switch and the third input terminal of the second circuit module. The second terminal of the fourth bidirectional switch is connected to the first terminal of the fifth bidirectional switch whose second terminal is connected to both the first terminal of the sixth bidirectional switch and the fourth input terminal of the second circuit module. The second terminal of the sixth bidirectional switch is connected to the positive terminal of the second diode whose negative terminal is connected to the second input terminal of the second circuit module. The common terminal of the fourth and the fifth bidirectional switches is connected to the output terminal of the second circuit module.

In some embodiments, the common terminal of the two DC power supplies is connected to a second terminal of AC utilities or AC load.

In some embodiments, the second circuit module is connected to a filtering inductor which is connected between the output terminal of the second circuit module and the first terminal of AC utilities or AC load. The filtering inductor is used to filter the switching frequency component and achieve a load current with almost a sinusoidal waveform.

According to a second aspect of the invention, there is provided a second kind of single phase four-level inverter topology unit which outputs four mutually different voltage levels. It comprises a first circuit module and a second circuit module.

The first circuit module comprises a first terminal, a second terminal, a third terminal and a fourth terminal. There is at least one circuit branch between the first terminal and the third terminal, and between the second terminal and the fourth terminal. The first terminal of the first circuit module is connected to the positive terminal of the first DC power supply, and the second terminal of the first circuit module is connected to the negative terminal of the second DC power supply.

In some embodiments, the circuit branch which is connected between the first terminal and the third terminal of the first circuit module or between the second terminal and the fourth terminal of the first circuit module comprises at least one bidirectional switch.

The second circuit module comprises a floating capacitor, a first input terminal, a second input terminal, a third input terminal, a fourth input terminal and an output terminal. There is at least one circuit branch between each of the input terminals and the output terminal.

The third terminal of the first circuit module is connected to the third input terminal of the second circuit module and the fourth terminal of the first circuit module is connected to the fourth input terminal of the second circuit module. The first input terminal of the second circuit module is connected to the positive terminal of the first DC power supply and the second input terminal of the second circuit module is connected to the negative terminal of the second DC power supply. The output terminal of the second circuit module is connected to a first terminal of AC utilities or AC load.

In some embodiments, the second circuit module further comprises a current limiting device, such as an inductor, resistor, semiconductor device operated at active mode or linear mode, or the combination of the above devices. The current limiting device is used to limit the surge current when the floating capacitor is charged. That is, the current limiting device forms part of the charging circuit loop of the floating capacitor.

In some implementation, the current limiting device is comprised of a current-limiting inductor.

The first circuit module provides at least two circuit branches: one circuit branch is connected between the first DC power supply and one input terminal of the second circuit module, and the other is connected between the second DC power supply and another input terminal of the second circuit module. The two circuit branches are extended to the floating capacitor inside of the second circuit module. The floating capacitor is charged by the two serially connected DC power supplies simultaneously. The second circuit module outputs four mutually different voltage levels.

In some embodiments, the first circuit module further comprises a first bidirectional switch, a second bidirectional switch, a first diode and a second diode.

The first terminal of the first bidirectional switch is connected to the first terminal of the first circuit module and the second terminal of the first bidirectional switch is connected to the positive terminal of the first diode whose negative terminal is connected to the third terminal of the first circuit module. The second terminal of the second bidirectional switch is connected to the second terminal of the first circuit module and the first terminal of the second bidirectional switch is connected to the negative terminal of the second diode whose positive terminal is connected to the fourth terminal of the first circuit module.

In some embodiments, the first circuit module further comprises a first bidirectional switch, a second bidirectional switch, a third bidirectional switch and a fourth bidirectional switch.

The first terminal of the first bidirectional switch is connected to the first terminal of the first circuit module and the second terminal of the first bidirectional switch is connected to the second terminal of the second bidirectional switch whose first terminal is connected to the third terminal of the first circuit module. The second terminal of the third bidirectional switch is connected to the second terminal of the first circuit module and the first terminal of the third bidirectional switch is connected to the first terminal of the fourth bidirectional switch whose second terminal is connected to the fourth terminal of the first circuit module.

In some embodiments, the second circuit module further comprises a first bidirectional switch, a second bidirectional switch, a third bidirectional switch, a fourth bidirectional switch, a fifth bidirectional switch and a sixth bidirectional switch.

The first terminal of the first bidirectional switch is connected to the first input terminal of the second circuit module and the second terminal of the first bidirectional switch is connected to the first terminal of the second bidirectional switch whose second terminal is connected to the second input terminal of the second circuit module. The first terminal of the third bidirectional switch is connected to both the third input terminal of the second circuit module and the positive terminal of the floating capacitor, and the second terminal of the third bidirectional switch is connected to the first terminal of the fourth bidirectional switch whose second terminal is connected to both the fourth input terminal of the second circuit module and the negative terminal of the floating capacitor. The current-limiting inductor is connected between the first terminal of the second bidirectional switch and the first terminal of the fourth bidirectional switch. The first terminal of the fifth bidirectional switch is connected to the positive terminal of the floating capacitor and the second terminal of the fifth bidirectional switch is connected to the first terminal of the sixth bidirectional switch whose second terminal is connected to the negative terminal of the floating capacitor. The common terminal of the fifth bidirectional switch and the sixth bidirectional switch is connected to the output terminal of the second circuit module.

In some embodiments, the common terminal of the two DC power supplies is connected to a second terminal of AC utilities or AC load.

In some embodiments, the second circuit module is connected to a filtering inductor which is connected between the output terminal of the second circuit module and the first terminal of AC utilities or AC load. The filtering inductor is used to filter the switching frequency component and achieve a load current with almost a sinusoidal waveform.

According to a third aspect of the invention, there is provided a first kind of three-phase four-level inverter topology which is used with one DC power supply. It comprises three single phase four-level inverter topology units provided in the first aspect of the invention. Both the first terminal and the second terminal of the first circuit module in each single phase four-level inverter topology unit form the input terminals of the three-phase four-level inverter topology. The output terminal of the second circuit module in each single phase four-level inverter topology unit forms an AC output terminal of the three-phase four-level inverter topology. The three single phase four-level inverter topology units are connected in parallel at their input sides with the DC power supply. The AC output terminals of the three single phase four-level inverter topology units are respectively connected to three phases of AC utilities or AC load.

According to a fourth aspect of the invention, there is provided a second kind of three-phase four-level inverter topology which is used with one DC power supply. It comprises three single phase four-level inverter topology units provided in the second aspect of the invention. Both the first terminal and the second terminal of the first circuit module in each single phase four-level inverter topology unit form the input terminals of the three-phase four-level inverter topology. The output terminal of the second circuit module in each single phase four-level inverter topology unit forms an AC output terminal of the three-phase four-level inverter topology. The three single phase four-level inverter topology units are connected in parallel at their input sides with the DC power supply. The AC output terminals of the three single phase four-level inverter topology units are respectively connected to three phases of AC utilities or AC load.

According to a fifth aspect of the invention, there is provided a third kind of three-phase four-level inverter topology which is used with one DC power supply. It comprises two single phase four-level inverter topology units provided in the first aspect of the invention and one single phase four-level inverter topology unit provided in the second aspect of the invention, or comprises one single phase four-level inverter topology unit provided in the first aspect of the invention and two single phase four-level inverter topology units provided in the second aspect of the invention. Both the first terminal and the second terminal of the first circuit module in each single phase four-level inverter topology unit form the input terminals of the three-phase four-level inverter topology. The output terminal of the second circuit module in each single phase four-level inverter topology unit forms an AC output terminal of the three-phase four-level inverter topology. The three single phase four-level inverter topology units are connected in parallel at their input sides with the DC power supply. The AC output terminals of the three single phase four-level inverter topology units are respectively connected to three phases of AC utilities or AC load.

Disclosed are single phase four-level inverter topology unit comprising a floating capacitor and three-phase four-level inverter topology, wherein both the system cost and the size is reduced, and the voltage utilization ratio is three times of that of the present four-level inverter topology under the same operating conditions by using the floating capacitor; the DC link mid-point voltage can be balanced without additional circuitry.

The four-level inverter topology provided in the invention can be used for, but not limited to, renewable energy power system, such as single-phase or three-phase photovoltaic system.

BRIEF DESCRIPTION OF THE DRAWINGS

In order to clearly present this invention, the circuit implementations discussed in the invention are accompanied with the following drawing.

FIG. 1 (*b*) is a circuit diagram of a second kind of present single phase four-level inverter topology unit.

FIG. 2 (*b*) is the schematic circuit diagram in block form of single phase four-level inverter topology unit with a current-limiting device according to an embodiment of the invention.

FIG. 3 (*b*) is the schematic circuit diagram in block form of the first kind of single phase four-level inverter topology unit with a current-limiting device according to an embodiment of the invention.

FIG. 21 (b) is the circuit diagram in block form of a three-phase four-level inverter topology based on the equivalent circuit in FIG. 21(a) according to an embodiment of the invention.

FIG. 22 (b) is the circuit diagram in block form of a three-phase four-level inverter topology based on the equivalent circuit in FIG. 22(a) according to an embodiment of the invention.

FIG. 23 (b) is the circuit diagram in block form of a second three-phase four-level inverter topology based on the equivalent circuit in FIG. 21(a) and FIG. 22(a) according to an embodiment of the invention.

For convenience in description, identical components have been given the same reference numbers in the various drawings. The same symbols like "V" as used in one drawing are intended to refer to be connected with each other.

DETAILED DESCRIPTION OF THE EMBODIMENTS

Provided herein is a four-level inverter topology. For a better understanding of the invention, and to show more clearly how it may be carried into effect, embodiments will be described in detail with reference to the accompanying drawings. Of course, the embodiments described below are part of the invention examples, not all of them. Those skilled in the art will recognize or be able to ascertain variants of the embodiments described herein. Such variants are within the scope of the invention and are covered by the appended claims.

As shown in the figures below, the term $V_{dc}$ is DC power supply voltage, M is the four-level inverter topology unit, $C_1$ is a first capacitor which acts as the first DC power supply, $C_2$ is a second capacitor which acts as the second DC power supply and $C_s$ is the floating capacitor.

For the purpose of this description of the invention, the ratio of the peak-peak value of AC output voltage from the inverter to the minimum DC input voltage which equals $V_{dc}$ in the embodiments is defined as the voltage utilization ratio.

For the purpose of this description, diode will be used below as a non-limiting example for all the elements characterized by single directional conduction in the invention. The positive terminal of a diode is referred to Anode and the negative terminal is Cathode. It will be understood that other suitable devices may be used for the elements characterized by single directional conduction in the invention.

For the purpose of this description, the switch MOSFET will be used as a non-limiting example for all the semiconductor switches characterized by controllable conduction in the invention. Take the N-channel MOSFET for example. The first terminal of the N-channel MOSFET is referred to Drain, the second terminal is Source and the control terminal is Gate. The control terminal of each semiconductor switch in the invention is provided with its own control signal. For the sake of brevity, it is not described repeatedly below. It will be understood that other suitable devices, for example, IGBT may be used for the semiconductor switches characterized by controllable conduction in the invention.

For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

Figure 1:
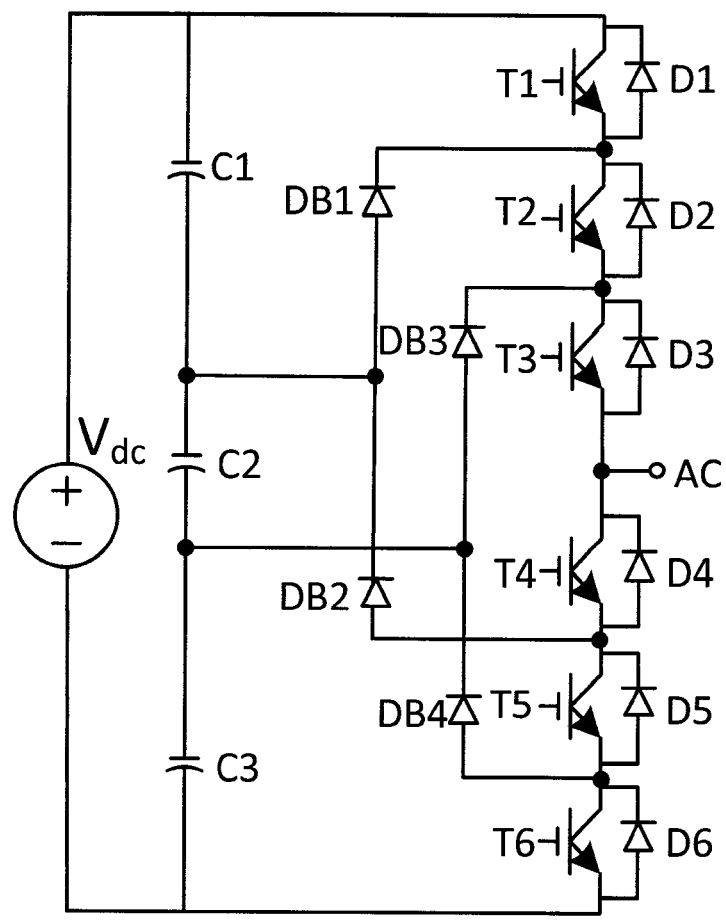
FIG. 1 (*a*) is a circuit diagram of a first kind of present single phase four-level inverter topology unit.
Figure 1:
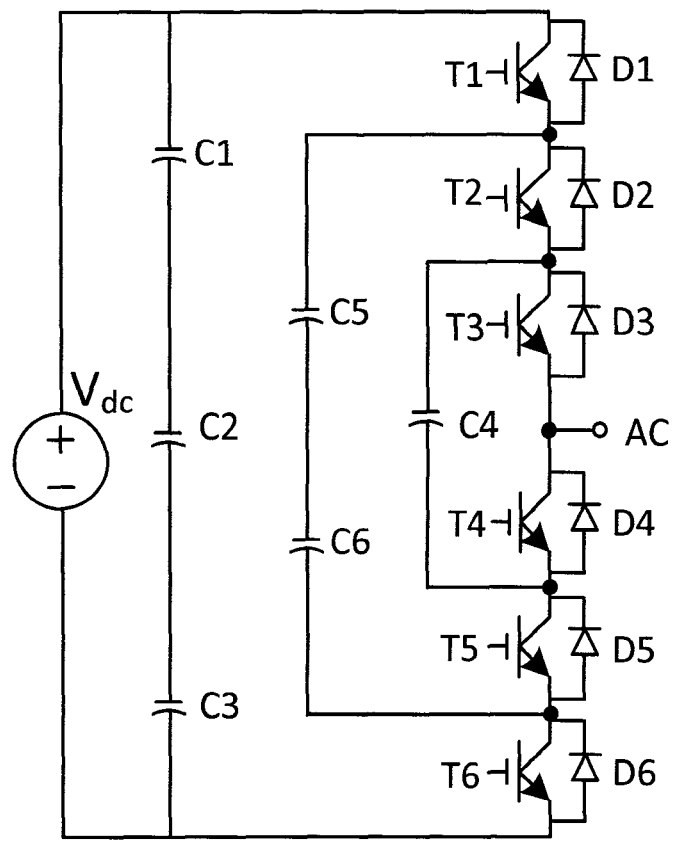
Figure 2:
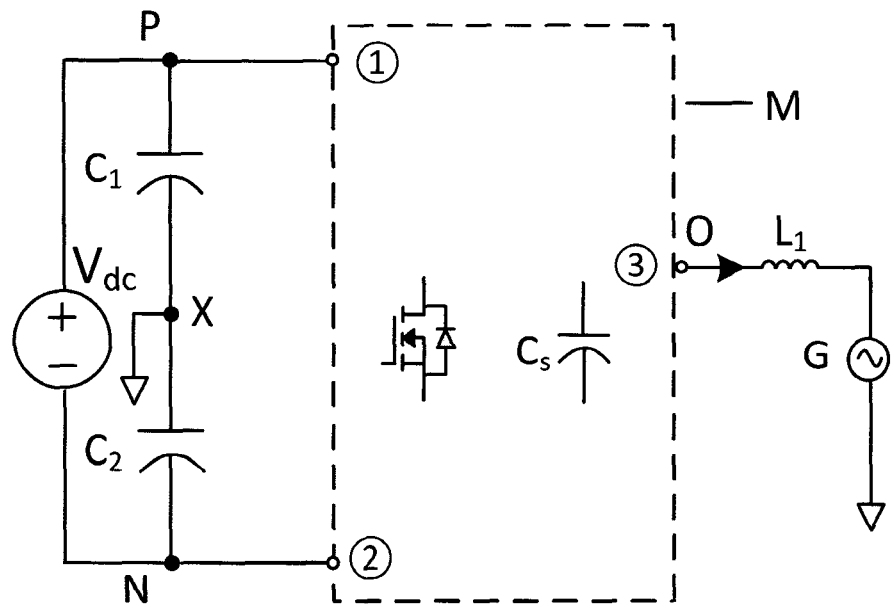
FIG. 2 (*a*) is the schematic circuit diagram in block form of single phase four-level inverter topology unit according to an embodiment of the invention.
Figure 2:
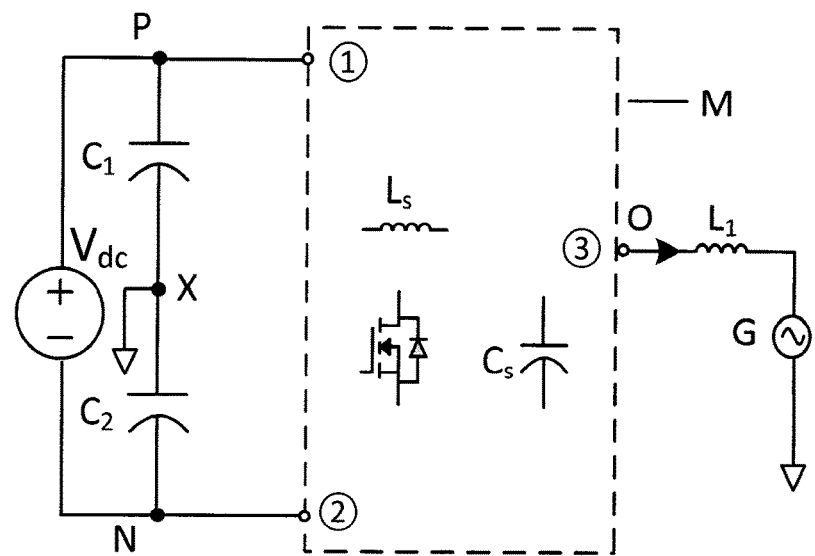

FIG. 2 (a) shows the schematic circuit diagram in block form of single phase four-level inverter topology unit according to an embodiment of the invention. The input side of the four-level inverter topology unit M is connected with two capacitors (the first capacitor $C_1$ and the second capacitor $C_2$) connected in series. Each capacitor acts as a DC power supply. The four-level inverter topology unit M produces four mutually different voltage levels; wherein it comprises at least the floating capacitor $C_s$ and circuit branches from both the first capacitor $C_1$ and the second capacitor $C_2$ to the floating capacitor $C_s$, and the floating capacitor $C_s$ is charged by the two serially connected capacitors simultaneously; either the first capacitor $C_1$ or the second capacitor $C_2$ provides power to the load of the four-level inverter topology unit M, or the first capacitor $C_1$ or the second capacitor $C_2$ alternatively added algebraically to the floating capacitor $C_s$ provides power to the load of the four-level inverter topology unit M.

The four-level inverter topology unit M is connected to a first terminal of the filtering inductor $L_1$ whose second terminal is connected to a first terminal of AC utilities or AC load. The filtering inductor $L_1$ is used to filter the switching frequency component and achieve a load current with almost a sinusoidal waveform. The common terminal of the first capacitor $C_1$ and the second capacitor $C_2$ is connected to a second terminal of AC utilities or AC load.

FIG. 2 (b) shows the schematic circuit diagram in block form of an improved single phase four-level inverter topology unit according to an embodiment of the invention. It further comprises a current-limiting inductor $L_s$ based on the one in FIG. 2 (a). The current-limiting inductor $L_s$ is used to limit the surge current when the floating capacitor $C_s$ is charged. That is, the current limiting device forms part of the charging circuit loop of the floating capacitor $C_s$. The current-limiting inductor $L_s$ can be replaced by any other current limiting device, such as an inductor, resistor, semiconductor device operated at active mode or linear mode, or the combination of the above devices.

Figure 3:
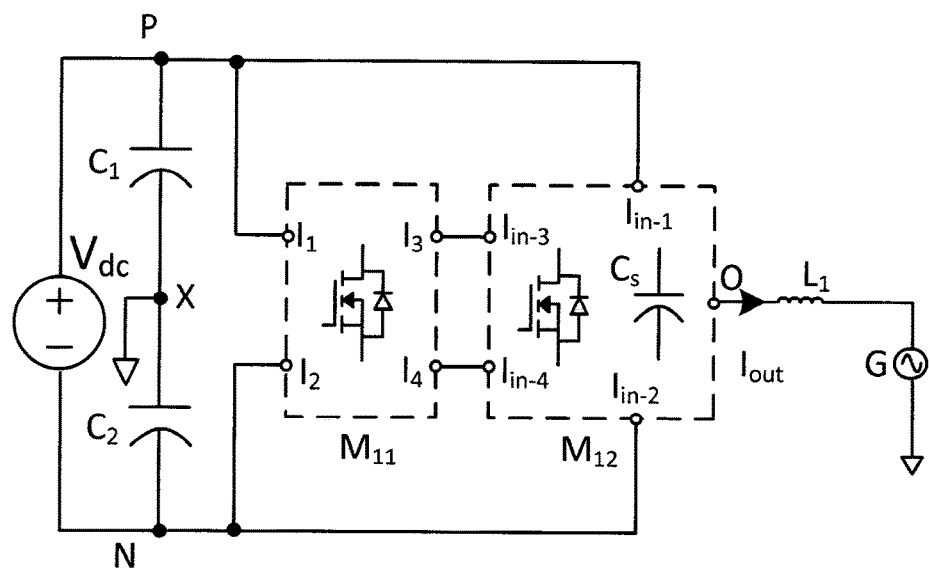
FIG. 3 (*a*) is the schematic circuit diagram in block form of the first kind of single phase four-level inverter topology unit according to an embodiment of the invention.
Figure 3:
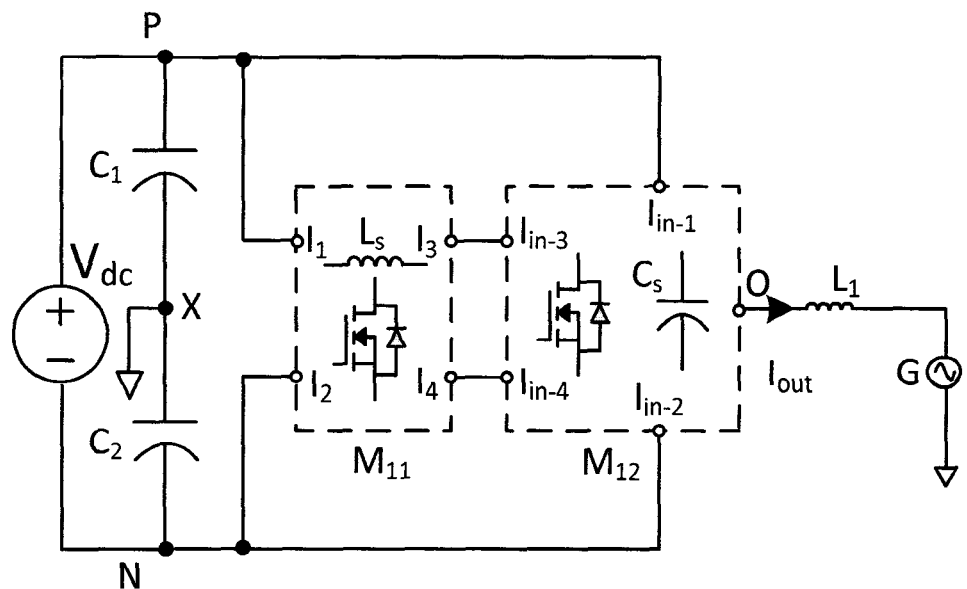

FIG. 3 (a) shows the schematic circuit diagram in block form of a first kind of single phase four-level inverter topology unit according to an embodiment of the invention. It comprises the first circuit module $M_{11}$ and the second circuit module $M_{12}$.

The first circuit module $M_{11}$ comprises a first terminal $I_1$, a second terminal $I_2$, a third terminal $I_3$ and a fourth terminal $I_4$. There is at least one circuit branch between the first terminal $I_1$ and the third terminal $I_3$, and between the second terminal $I_2$ and the fourth terminal $I_4$. The first terminal $I_1$ of the first circuit module $M_{11}$ is connected to the positive terminal of the first capacitor $C_1$, and the second terminal $I_2$ of the first circuit module $M_{11}$ is connected to the negative terminal of the second capacitor $C_2$.

The circuit branch which is connected between the first terminal $I_1$ and the third terminal $I_3$ of the first circuit module $M_{11}$ or between the second terminal $I_2$ and the fourth terminal $I_4$ of the first circuit module $M_{11}$ comprises at least one bidirectional switch.

The second circuit module $M_{12}$ comprises the floating capacitor $C_s$, a first input terminal $I_{in-1}$, a second input terminal $I_{in-2}$, a third input terminal $I_{in-3}$, a fourth input terminal $I_{in-4}$ and an output terminal $I_{out}$. There is at least one circuit branch between each of the input terminals and the output terminal $I_{out}$.

The third terminal $I_3$ of the first circuit module $M_{11}$ is connected to the third input terminal $I_{in-3}$ of the second circuit module $M_{12}$ and the fourth terminal $I_4$ of the first circuit module $M_{11}$ is connected to the fourth input terminal $I_{in-4}$ of the second circuit module $M_{12}$. The first input terminal $I_{in-1}$ of the second circuit module $M_{12}$ is connected to the positive terminal of the first capacitor $C_1$ and the second input terminal $I_{in-2}$ of the second circuit module $M_{12}$ is connected to the negative terminal of the second capacitor $C_2$. The output terminal $I_{out}$ of the second circuit module $M_{12}$ is connected to a first terminal of the filtering inductor $L_1$ whose second terminal is connected to a first terminal of AC utilities or AC load. The common terminal of the first capacitor $C_1$ and the second capacitor $C_2$ is connected to a second terminal of AC utilities or AC load.

The first circuit module $M_{11}$ provides at least two circuit branches: one circuit branch is connected between the first capacitor $C_1$ and one input terminal of the second circuit module, and the other is connected between the second capacitor $C_2$ and another input terminal of the second circuit module. The two circuit branches are extended to the floating capacitor $C_s$ inside of the second circuit module. The floating capacitor $C_s$ is charged by both the first capacitor $C_1$ and the second capacitor $C_2$ simultaneously. The second circuit module $M_{12}$ produces four mutually different voltage levels.

FIG. 3 (b) shows the schematic circuit diagram in block form of a first kind of improved single phase four-level inverter topology unit according to an embodiment of the invention. In contrast with the one in FIG. 3 (a), the difference between them is that the first circuit module $M_{11}$ further comprises a current-limiting inductor $L_s$. The current-limiting inductor $L_s$ acts as the same role with that in FIG. 2 (b). For the sake of brevity, it is not described repeatedly here.

Figure 4:
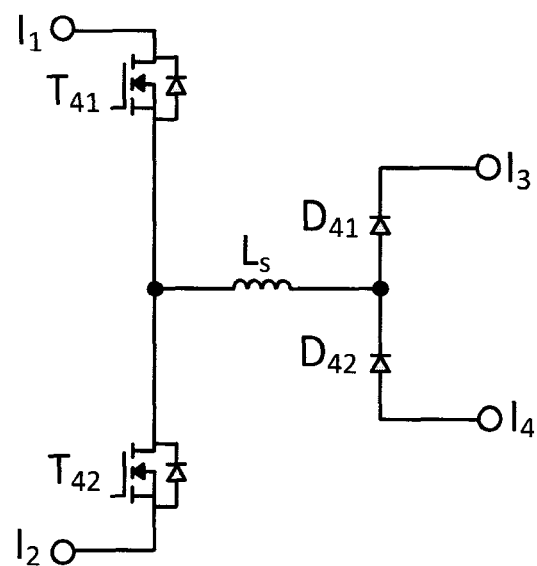
FIG. 4 is the first circuit diagram of the first circuit module $M_{11}$ for the first kind of single phase four-level inverter topology unit according to an embodiment of the invention.

FIG. 4 shows the first circuit diagram of the first circuit module $M_{11}$ for the first kind of single phase four-level inverter topology unit according to an embodiment of the invention. The first circuit module $M_{11}$ comprises the current-limiting inductor $L_s$, a first bidirectional switch $T_{41}$, a second bidirectional switch $T_{42}$, a first diode $D_{41}$ and a second diode $D_{42}$.

The first terminal of the first bidirectional switch $T_{41}$ is connected with the first terminal $I_1$ of the first circuit module $M_1$ and the second terminal of the first bidirectional switch $T_{41}$ is connected with the first terminal of the second bidirectional switch $T_{42}$ whose second terminal is connected to the second terminal $I_2$ of the first circuit module $M_{11}$. The positive terminal of the first diode $D_{41}$ is connected with the negative terminal of the second diode $D_{42}$, and the negative terminal of the first diode $D_{41}$ is connected with the third terminal $I_3$ of the first circuit module $M_{11}$. The positive terminal of the second diode $D_{42}$ is connected with the fourth terminal $I_4$ of the first circuit module $M_{11}$.

The current-limiting inductor $L_s$ is connected between the first terminal of the second bidirectional switch $T_{42}$ and the positive terminal of the first diode $D_{41}$.

Figure 5:
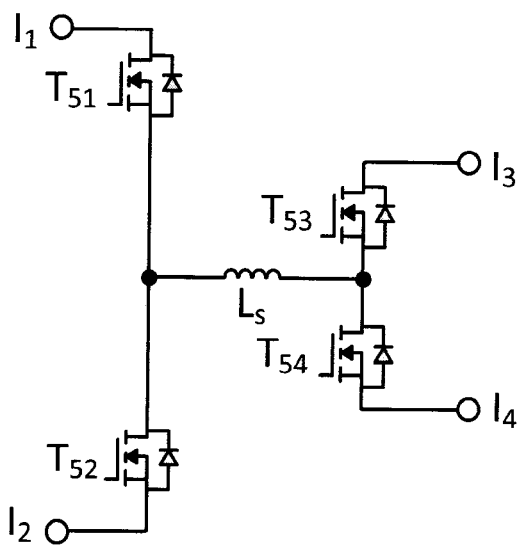
FIG. 5 is the second circuit diagram of the first circuit module $M_{11}$ for the first kind of single phase four-level inverter topology unit according to an embodiment of the invention.

FIG. 5 shows the second circuit diagram of the first circuit module $M_{11}$ for the first kind of single phase four-level inverter topology unit according to an embodiment of the invention. The first circuit module $M_{11}$ comprises a first bidirectional switch $T_{51}$, a second bidirectional switch $T_{52}$, a third bidirectional switch $T_{53}$, a fourth bidirectional switch $T_{54}$, and the current-limiting inductor $L_s$.

The first terminal of the first bidirectional switch $T_{51}$ is connected with the first terminal $I_1$ of the first circuit module $M_{11}$ and the second terminal of the first bidirectional switch $T_{51}$ is connected with the first terminal of the second bidirectional switch $T_{52}$ whose second terminal is connected to the second terminal $I_2$ of the first circuit module $M_{11}$. The first terminal of the third bidirectional switch $T_{53}$ is connected with the third terminal $I_3$ of the first circuit module $M_{11}$ and the second terminal of the third bidirectional switch $T_{53}$ is connected with the first terminal of the fourth bidirectional switch $T_{54}$ whose second terminal is connected to the fourth terminal $I_4$ of the first circuit module $M_{11}$.

The current-limiting inductor $L_s$ is connected between the first terminal of the second bidirectional switch $T_{52}$ and the first terminal of the fourth bidirectional switch $T_{54}$.

Figure 6:
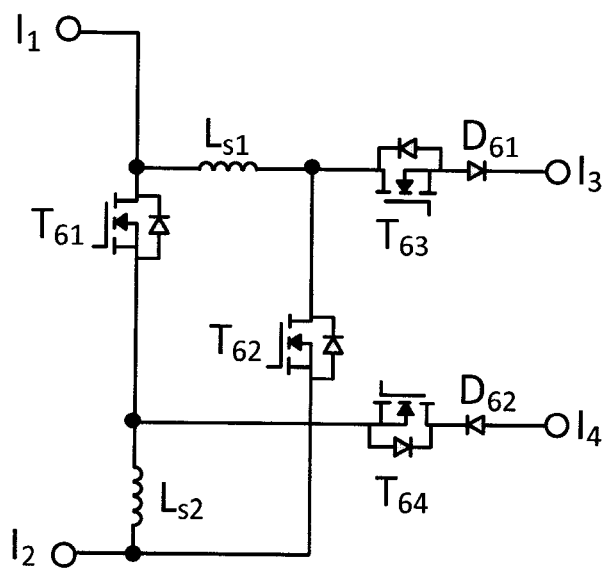
FIG. 6 is the third circuit diagram of the first circuit module $M_{11}$ for the first kind of single phase four-level inverter topology unit according to an embodiment of the invention.

FIG. 6 shows the third circuit diagram of the first circuit module $M_{11}$ for the first kind of single phase four-level inverter topology unit according to an embodiment of the invention. The first circuit module $M_{11}$ comprises a first bidirectional switch $T_{61}$, a second bidirectional switch $T_{62}$, a third bidirectional switch $T_{63}$, a fourth bidirectional switch $T_{64}$, a first diode $D_{61}$, a second diode $D_{62}$, a first current-limiting inductor $L_{s5}$ and a second current-limiting inductor $L_{s2}$.

The first terminal of the first bidirectional switch $T_{61}$ is connected with both the first terminal $I_1$ of the first circuit module $M_{11}$ and a first terminal of the first current-limiting inductor $L_{s1}$, and the second terminal of the first bidirectional switch $T_{61}$ is connected with a first terminal of the second current-limiting inductor $L_{s2}$ whose second terminal is connected to the second terminal $I_2$ of the first circuit module $M_{11}$. A second terminal of the first current-limiting inductor $L_{s1}$ is connected to the first terminal of the second bidirectional switch $T_{62}$ whose second terminal is connected to the second terminal $I_2$ of the first circuit module $M_{11}$. The first terminal of the third bidirectional switch $T_{63}$ is connected with the second terminal of the first current-limiting inductor $L_{s1}$ and the second terminal of the third bidirectional switch $T_{63}$ is connected with the positive terminal of the first diode $D_{61}$ whose negative terminal is connected to the third terminal $I_3$ of the first circuit module $M_{11}$. The second terminal of the fourth bidirectional switch $T_{64}$ is connected to the first terminal of the second current-limiting inductor $L_{s2}$ and the first terminal of the fourth bidirectional switch $T_{64}$ is connected to the negative terminal of the second diode $D_{62}$ whose positive terminal is connected to the fourth terminal $I_4$ of the first circuit module $M_{11}$.

The first current-limiting inductor $L_{s1}$ and the second current-limiting inductor $L_{s2}$ work alternately as a current-limiting device every half gird voltage cycle. The first current-limiting inductor $L_{s1}$ works in free-wheeling mode when the second current-limiting inductor $L_{s2}$ works as a current-limiting device, vice versa.

Figure 7:
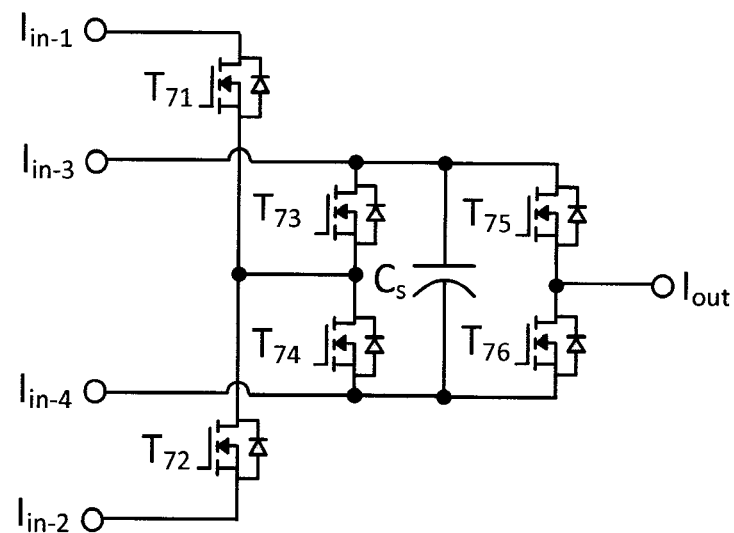
FIG. 7 is the first circuit diagram of the second circuit module $M_{12}$ for the first kind of single phase four-level inverter topology unit according to an embodiment of the invention.

FIG. 7 shows the first circuit diagram of the second circuit module $M_{12}$ for the first kind of single phase four-level inverter topology unit according to an embodiment of the invention. The second circuit module $M_{12}$ comprises the floating capacitor $C_s$, a first bidirectional switch $T_{71}$, a second bidirectional switch $T_{72}$, a third bidirectional switch $T_{73}$, a fourth bidirectional switch $T_{74}$, a fifth bidirectional switch $T_{75}$ and a sixth bidirectional switch $T_{76}$.

The first terminal of the first bidirectional switch $T_{71}$ is connected to the first input terminal $I_{in-1}$ of the second circuit module $M_{12}$ and the second terminal of the first bidirectional switch $T_{71}$ is connected to the first terminal of the second bidirectional switch $T_{72}$ whose second terminal is connected to the second input terminal $I_{in-2}$ of the second circuit module $M_{12}$. The first terminal of the third bidirectional switch $T_{73}$ is connected to both the third input terminal $I_{in-3}$ of the second circuit module $M_{12}$ and the positive terminal of the floating capacitor $C_s$. The second terminal of the third bidirectional switch $T_{73}$ is connected to the first terminal of the fourth bidirectional switch $T_{74}$ whose second terminal is connected to both the fourth input terminal $I_{in-4}$ of the second circuit module $M_{12}$ and the negative terminal of the floating capacitor $C_s$. The common terminal of the third and the fourth bidirectional switches is connected to the common terminal of the first and the second bidirectional switches. The first terminal of the fifth bidirectional switch $T_{75}$ is connected to the positive terminal of the floating capacitor $C_s$ and the second terminal of the fifth bidirectional switch $T_{75}$ is connected to the first terminal of the sixth bidirectional switch $T_{76}$ whose second terminal is connected to the negative terminal of the floating capacitor $C_s$. The common terminal of the fifth and the sixth bidirectional switches is connected to the output terminal $I_{out}$ of the second circuit module $M_{12}$.

Figure 8:
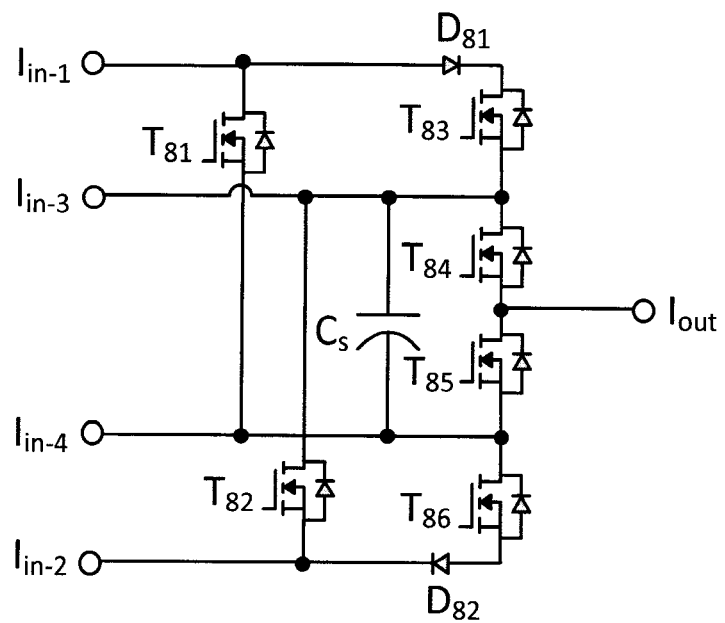
FIG. 8 is the second circuit diagram of the second circuit module $M_{12}$ for the first kind of single phase four-level inverter topology unit according to an embodiment of the invention.

FIG. 8 shows the second circuit diagram of the second circuit module $M_{12}$ for the first kind of single phase four-level inverter topology unit according to an embodiment of the invention. The second circuit module $M_{12}$ comprises the floating capacitor $C_s$, a first diode $D_{81}$, a second diode $D_{82}$, a first bidirectional switch $T_{81}$, a second bidirectional switch $T_{82}$, a third bidirectional switch $T_{83}$, a fourth bidirectional switch $T_{84}$, a fifth bidirectional switch $T_{85}$ and a sixth bidirectional switch $T_{86}$.

The first terminal of the first bidirectional switch $T_{81}$ is connected to the first input terminal $I_{in-1}$ of the second circuit module $M_{12}$ and the second terminal of the first bidirectional switch $T_{81}$ is connected to both the fourth input terminal $I_{in-4}$ of the second circuit module $M_{12}$ and the negative terminal of the floating capacitor $C_s$. The first terminal of the second bidirectional switch $T_{82}$ is connected to both the third input terminal $I_{in-3}$ of the second circuit module $M_{12}$ and the positive terminal of the floating capacitor $C_s$, and the second terminal of the second bidirectional switch $T_{82}$ is connected to the second input terminal $I_{in-2}$ of the second circuit module $M_{12}$. The positive terminal of the first diode $D_{81}$ is connected to the first input terminal $I_{in-1}$ of the second circuit module $M_{12}$ and the negative terminal of the first diode $D_{81}$ is connected to the first terminal of the third bidirectional switch $T_{83}$ whose second terminal is connected to both the first terminal of the fourth bidirectional switch $T_{84}$ and the third input terminal $I_{in-3}$ of the second circuit module $M_{12}$. The second terminal of the fourth bidirectional switch $T_{84}$ is connected to the first terminal of the fifth bidirectional switch $T_{85}$ whose second terminal is connected to both the first terminal of the sixth bidirectional switch $T_{86}$ and the fourth input terminal $I_{in-4}$ of the second circuit module $M_{12}$. The second terminal of the sixth bidirectional switch $T_{86}$ is connected to the positive terminal of the second diode $D_{82}$ whose negative terminal is connected to the second input terminal $I_{in-2}$ of the second circuit module $M_{12}$. The common terminal of the fourth and the fifth bidirectional switches is connected to the output terminal $I_{out}$ of the second circuit module $M_{12}$.

Figure 9:
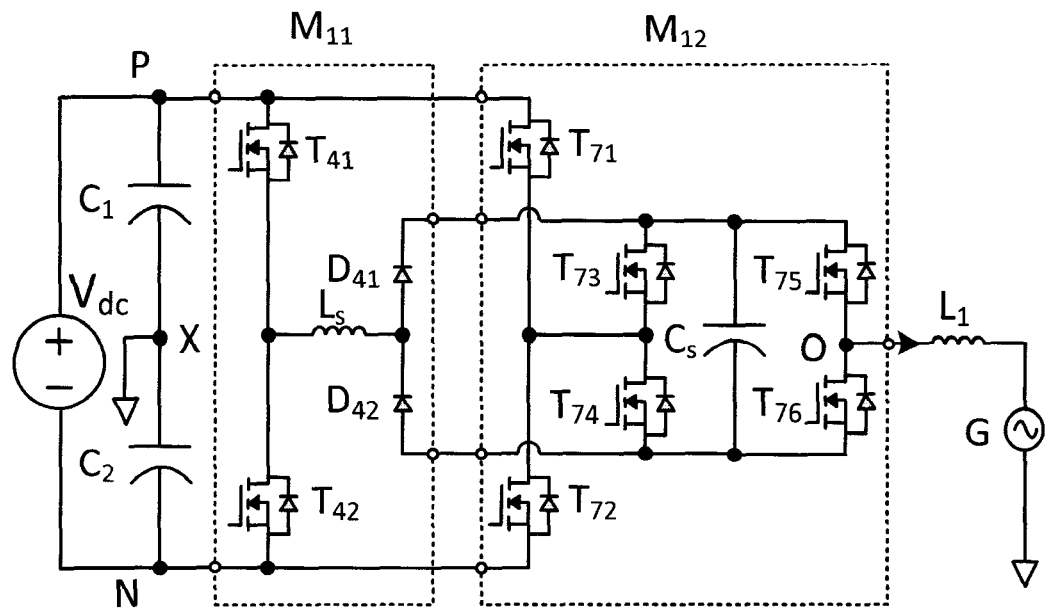
FIG. 9 is the circuit diagram of the first kind of single phase four-level inverter with both the first circuit module $M_{11}$ shown in FIG. 4 and the second circuit module $M_{12}$ shown in FIG. 7 according to an embodiment of the invention.

As shown in FIG. 9, take the single phase four-level inverter with both the first circuit module $M_{11}$ shown in FIG. 4 and the second circuit module $M_{12}$ shown in FIG. 7 for example to illustrate how it works. Six operational modes are provided.

Suppose the total voltage of DC power supply is $V_{dc}$. Both the said first capacitor $C_1$ voltage and the second capacitor $C_2$ voltage are half of $V_{dc}$ as their capacities are equal according to the embodiment. Since the said floating capacitor $C_s$ is charged by the two serially connected capacitors simultaneously, its voltage is $V_{dc}$. The current in the filtering inductor $L_1$ flowing from left to right in the accompanied drawings is defined as positive current and the opposite as negative current. The circuits with solid lines in the accompanied drawings work and those with dotted lines don't work.

Figure 10:
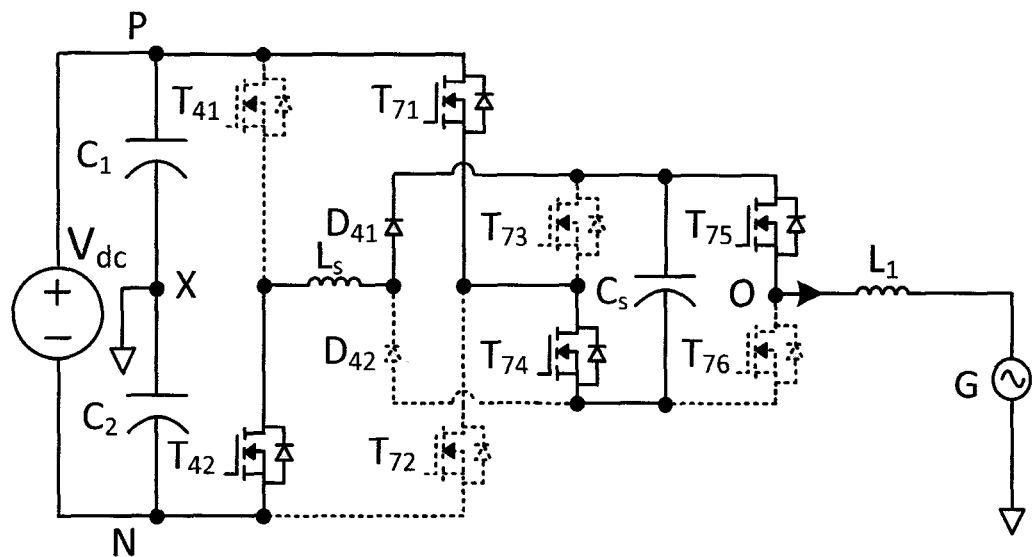
FIG. 10 is the first operational mode diagram of the single phase four-level inverter in FIG. 9 according to an embodiment of the invention.

The equivalent circuit of the first operational mode of the single phase four-level inverter is shown in FIG. 10. The positive current flows as follows: $C_1 \rightarrow T_{71} \rightarrow T_{74} \rightarrow C_s \rightarrow T_{75} \rightarrow L_1 \rightarrow G \rightarrow C_1$, and the negative current flows: $C_1 \rightarrow G \rightarrow L_1 \rightarrow T_{75} \rightarrow C_s \rightarrow T_{74} \rightarrow T_{71} \rightarrow C_1$. The output voltage $U_{OX}$ from the inverter equals the sum of the floating capacitor $C_s$ voltage and the first capacitor $C_1$ voltage. That is, $U_{OX} = V_{dc} + 0.5V_{dc} = 1.5V_{dc}$.

There is a freewheeling circuit loop for the current-limiting inductor $L_s$. It is as follow: $N \rightarrow T_{42} \rightarrow L_s \rightarrow D_{41} \rightarrow C_s \rightarrow T_{74} \rightarrow T_{71} \rightarrow C_1 \rightarrow C_2 \rightarrow N$. The current-limiting inductor $L_s$ can be short circuit, but the charge current in the floating capacitor will be higher.

Figure 11:
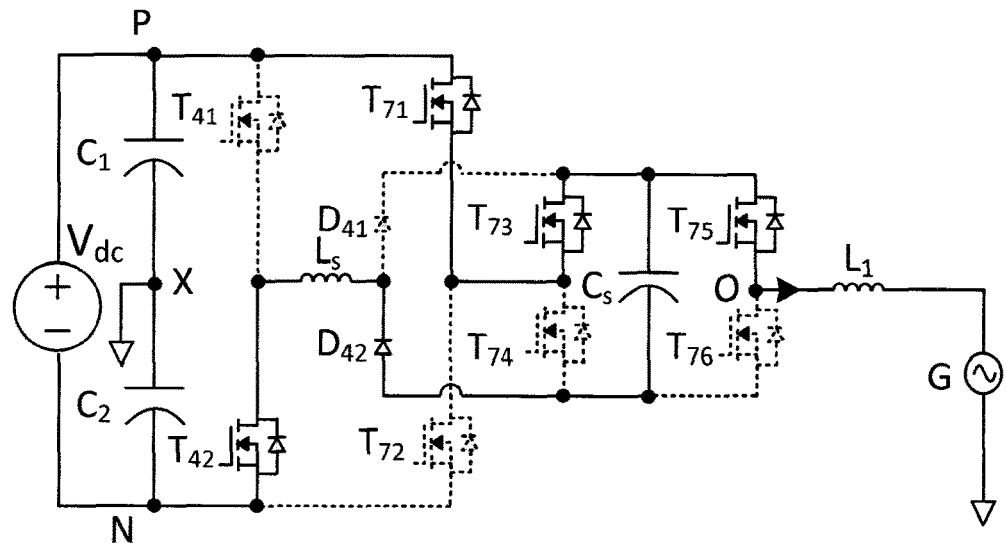
FIG. 11 is the second operational mode diagram of the single phase four-level inverter in FIG. 9 according to an embodiment of the invention.

The equivalent circuit of the second operational mode of the single phase four-level inverter is shown in FIG. 11. The positive current flows as follows: $C_1 \rightarrow T_{71} \rightarrow T_{73} \rightarrow T_{75} \rightarrow L_1 \rightarrow G \rightarrow G \rightarrow C_1$, and the negative current flows: $C_1 \rightarrow G\text{-}L_1 \rightarrow T_{75} \rightarrow T_{73} \rightarrow T_{71} \rightarrow C_1$. The output voltage $U_{OX}$ from the inverter equals the first capacitor $C_1$ voltage. That is, $U_{OX} = 0.5V_{dc}$.

There is a charging circuit loop for the floating capacitor $C_s$. It is as follow: $P \rightarrow T_{71} \rightarrow T_{73} \rightarrow C_s \rightarrow D_{42} \rightarrow L_s \rightarrow T_{42} \rightarrow C_2 \rightarrow C_1 \rightarrow P$. It can be observed that the two serially connected capacitors charge the floating capacitor simultaneously.

Figure 12:
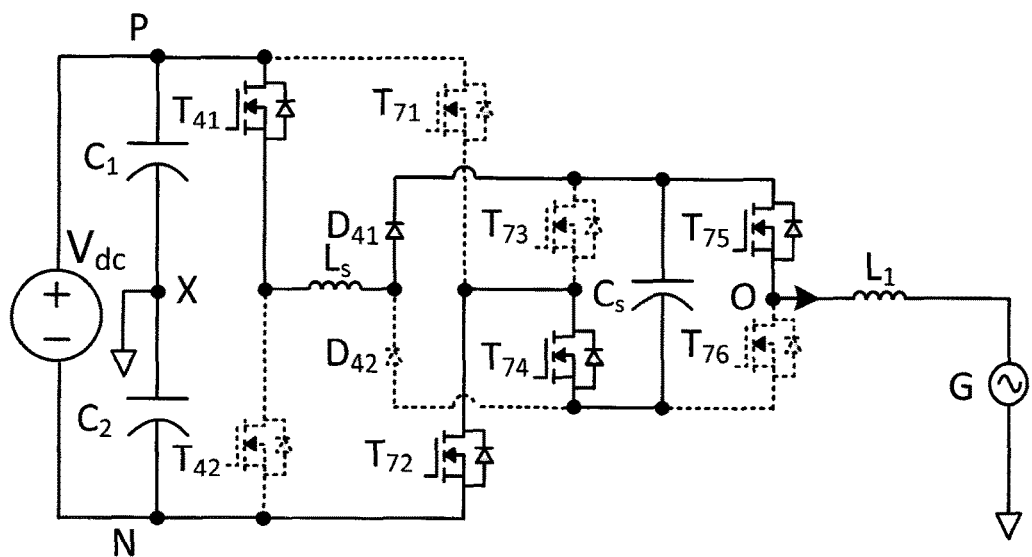
FIG. 12 is the third operational mode diagram of the single phase four-level inverter in FIG. 9 according to an embodiment of the invention.

The equivalent circuit of the third operational mode of the single phase four-level inverter is shown in FIG. 12. The positive current flows as follows: $C_2 \rightarrow T_{72} \rightarrow T_{74} \rightarrow C_s \rightarrow T_{75} \rightarrow L_1 \rightarrow G \rightarrow C_2$, and the negative current flows: $C_2 \rightarrow G \rightarrow L_1 \rightarrow T_{75} \rightarrow C_s \rightarrow T_{74} \rightarrow T_{72} \rightarrow C_2$. The output voltage $U_{OX}$ from the inverter equals the floating capacitor $C_s$ voltage minus the second capacitor $C_2$ voltage. That is, $U_{OX} = V_{dc} + (-0.5V_{dc}) = 0.5V_{dc}$.

There is a charging circuit loop for the floating capacitor $C_s$. It is as follow: $P \rightarrow T_{41} \rightarrow L_s \rightarrow D_{41} \rightarrow C_s \rightarrow T_{74} \rightarrow T_{72} \rightarrow C_2 \rightarrow C_1 \rightarrow P$.

Figure 13:
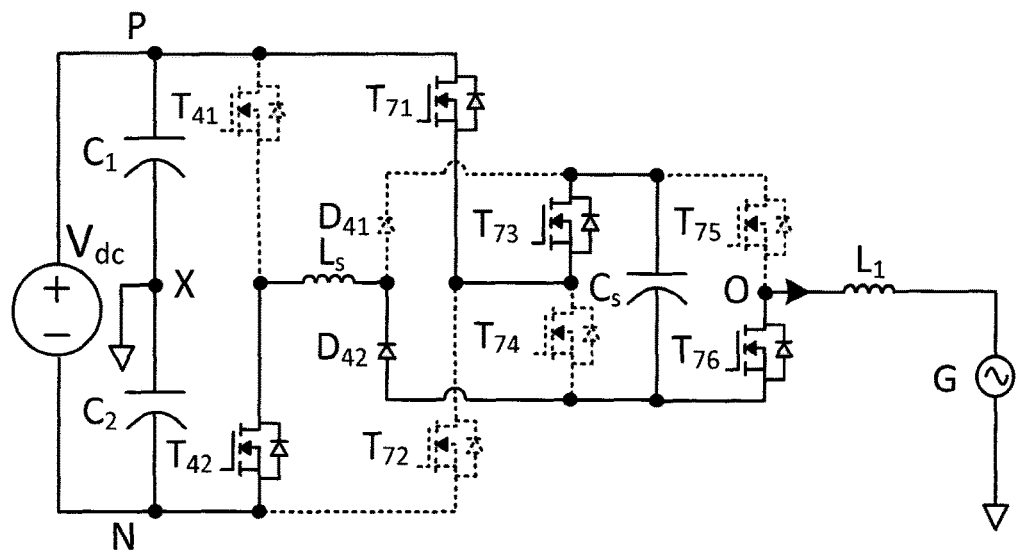
FIG. 13 is the fourth operational mode diagram of the single phase four-level inverter in FIG. 9 according to an embodiment of the invention.

The equivalent circuit of the fourth operational mode of the single phase four-level inverter is shown in FIG. 13. The positive current flows as follows: $C_1 \rightarrow T_{71} \rightarrow T_{73} \rightarrow C_s \rightarrow T_{76} \rightarrow L_1 \rightarrow G \rightarrow C_1$, and the negative current flows: $C_1 \rightarrow G \rightarrow L_1 \rightarrow T_{76} \rightarrow C_s \rightarrow T_{73} \rightarrow T_{71} \rightarrow C_1$. The output voltage $U_{OX}$ from the inverter equals the first capacitor $C_1$ voltage minus the floating capacitor $C_s$ voltage. That is, $U_{OX} = 0.5V_{dc} + (-V_{dc}) = -0.5V_{dc}$.

There is a charging circuit loop for the floating capacitor $C_s$. It is as follow: $P \rightarrow T_{71} \rightarrow T_{73} \rightarrow C_s \rightarrow D_{42} \rightarrow L_s \rightarrow T_{42} \rightarrow C_2 \rightarrow C_1 \rightarrow P$.

Figure 14:
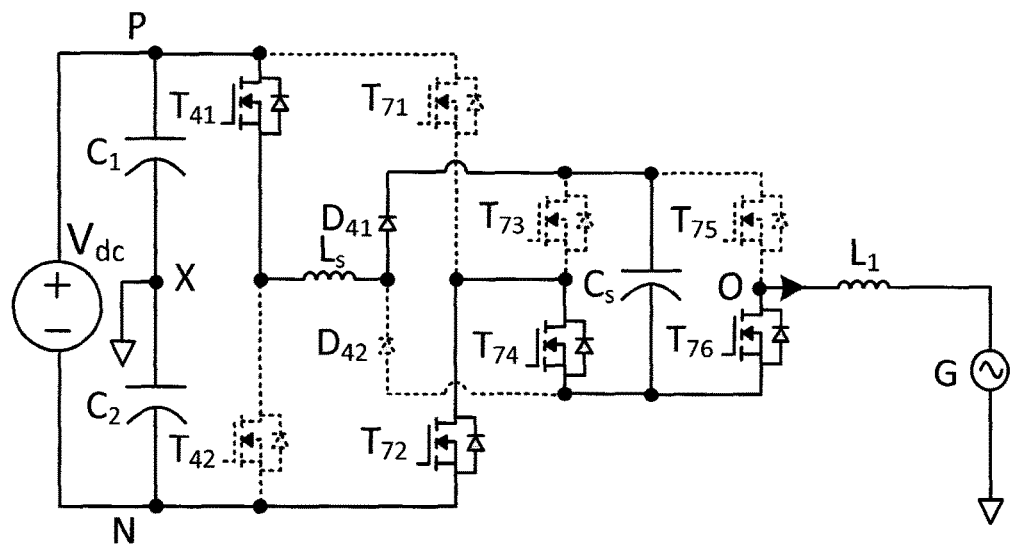
FIG. 14 is the fifth operational mode diagram of the single phase four-level inverter in FIG. 9 according to an embodiment of the invention.

The equivalent circuit of the fifth operational mode of the single phase four-level inverter is shown in FIG. 14. The positive current flows as follows: $C_2 \rightarrow T_{72} \rightarrow T_{74} \rightarrow T_{76} \rightarrow L_1 \rightarrow G \rightarrow C_2$, and the negative current flows: $C_2 \rightarrow G \rightarrow L_1 \rightarrow T_{76} \rightarrow T_{74} \rightarrow T_{72} \rightarrow C_2$. The output voltage $U_{OX}$ from the inverter equals the minus second capacitor $C_2$ voltage. That is, $U_{OX} = -0.5V_{dc}$.

There is a charging circuit loop for the floating capacitor $C_s$. It is as follow: $P \rightarrow T_{41} \rightarrow L_s \rightarrow D_{41} C_s \rightarrow T_{74} \rightarrow T_{72} \rightarrow C_2 \rightarrow C_1 \rightarrow P$.

Figure 15:
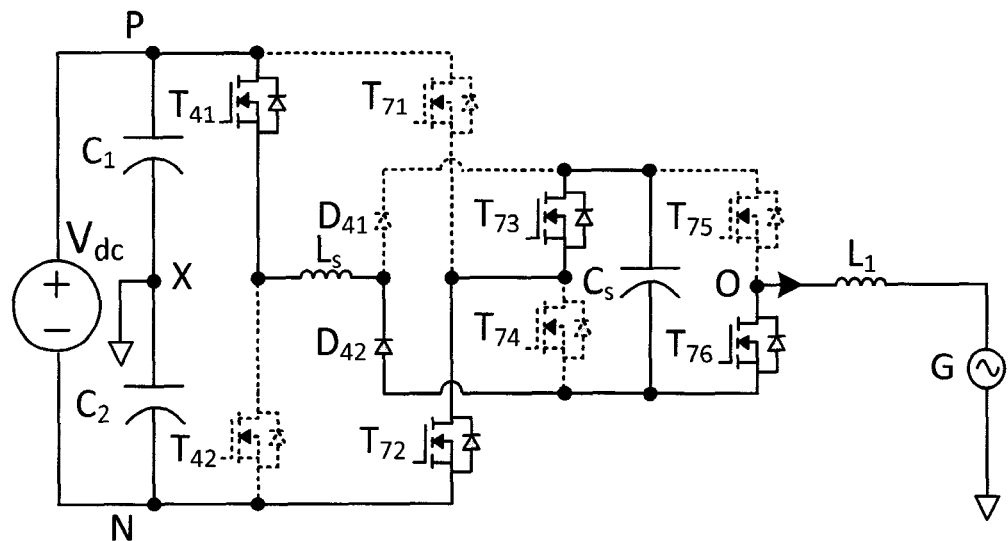
FIG. 15 is the sixth operational mode diagram of the single phase four-level inverter in FIG. 9 according to an embodiment of the invention.

The equivalent circuit of the sixth operational mode of the single phase four-level inverter is shown in FIG. 15. The positive current flows as follows: $C_2 \to T_{72} \to T_{73} \to C_s \to T_{76} \to L_1 \to G \to C_2$, and the negative current flows: $C_2 \to G \to L_1 \to T_{76} \to C_s \to T_{73} \to T_{72} \to C_2$. The output voltage $U_{OX}$ from the inverter equals the minus sum of the floating capacitor $C_s$ voltage and the second capacitor $C_2$ voltage. That is, $U_{OX}=(-V_{dc})+(-0.5V_{dc})=-1.5V_{dc}$.

There is a freewheeling circuit loop for the current-limiting inductor $L_s$. It is as follow: $N \to T_{72} \to T_{73} \to C_s \to D_{42} \to L_s \to T_{41} \to C_1 \to C_2 \to N$.

The single phase four-level inverter in FIG. 9 can work alternately among the six above-mentioned operational modes by controlling either of the on and off states of each switch to output the expected voltage. The output voltage $U_{OX}$ from the inverter in the second operational mode is equal to that of the third operational mode. It is flexible to choose from the second operational mode and the third operational mode in practical applications. It is the same to the fourth and the fifth operational modes.

It can be observed from the first and the sixth operational modes that the peak-peak value of AC output voltage from the inverter in the invention is $3V_{dc}$. So the voltage utilization ratio of the single phase four-level inverter in the invention is three. It is three times of that of the present single phase four-level inverter.

It is noted that the six operational modes described above contains three symmetrical groups. They are the first and the sixth operational modes, the second and the fifth operational modes, and the third and the fourth operational modes. So the mid-point voltage between the first capacitor $C_1$ and the second $C_2$ is balanced automatically. This is a significant advantage because no voltage balancing circuit is needed to balance the mid-point voltage. It reduces the system cost and size.

Figure 16:
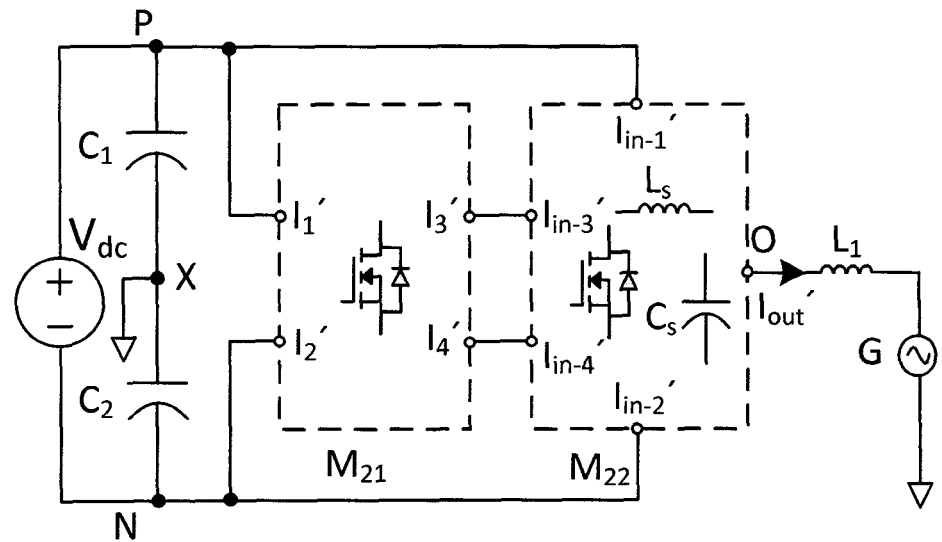
FIG. 16 is the schematic circuit diagram in block form of the second kind of single phase four-level inverter topology unit according to an embodiment of the invention.

FIG. 16 shows schematic circuit diagram in block form of a second kind of single phase four-level inverter topology unit according to an embodiment of the invention. It comprises the first circuit module $M_{21}$ and the second circuit module $M_{22}$.

The first circuit module $M_{21}$ comprises a first terminal $I_1'$, a second terminal $I_2'$, a third terminal $I_3'$ and a fourth terminal $I_4'$. There is at least one circuit branch between the first terminal $I_1'$ and the third terminal $I_3'$, and between the second terminal $I_2'$ and the fourth terminal $I_4'$. The first terminal $I_1'$ of the first circuit module $M_{21}$ is connected to the positive terminal of the first capacitor $C_1$, and the second terminal $I_2'$ of the first circuit module $M_{21}$ is connected to the negative terminal of the second capacitor $C_2$.

The circuit branch which is connected between the first terminal $I_1'$ and the third terminal $I_3'$ of the first circuit module $M_{21}$ or between the second terminal $I_2'$ and the fourth terminal $I_4'$ of the first circuit module $M_{21}$ comprises at least one bidirectional switch.

The second circuit module $M_{22}$ comprises the floating capacitor $C_s$, a current-limiting inductor $L_s$, a first input terminal $I_{in-1}'$, a second input terminal $I_{in-2}'$, a third input terminal $I_{in-3}'$, a fourth input terminal $I_{in-4}'$ and an output terminal $I_{out}'$. There is at least one circuit branch between each of the input terminals and the output terminal $I_{out}'$.

The current-limiting inductor $L_s$ is used to limit the surge current when the floating capacitor $C_s$ is charged. That is, the current limiting device forms part of the charging circuit loop of the floating capacitor $C_s$. The current-limiting inductor $L_s$ can be replaced by any other current limiting device, such as an inductor, resistor, semiconductor device operated at active mode or linear mode, or the combination of the above devices.

The third terminal $I_3'$ of the first circuit module $M_{21}$ is connected to the third input terminal $I_{in-3}'$ of the second circuit module $M_{22}$ and the fourth terminal $I_4'$ of the first circuit module $M_{21}$ is connected to the fourth input terminal $I_{in-4}'$ of the second circuit module $M_{22}$. The first input terminal $I_{in-1}'$ of the second circuit module $M_{22}$ is connected to the positive terminal of the first capacitor $C_1$ and the second input terminal $I_{in-2}'$ of the second circuit module $M_{22}$ is connected to the negative terminal of the second capacitor $C_2$. The output terminal $I_{out}'$ of the second circuit module $M_{22}$ is connected to a first terminal of the filtering inductor $L_1$ whose second terminal is connected to a first terminal of AC utilities or AC load. The common terminal of the first capacitor $C_1$ and the second capacitor $C_2$ is connected to a second terminal of AC utilities or AC load.

The first circuit module $M_{21}$ provides at least two circuit branches: one circuit branch is connected between the first capacitor $C_1$ and one input terminal of the second circuit module, and the other is connected between the second capacitor $C_2$ and another input terminal of the second circuit module. The two circuit branches are extended to the floating capacitor $C_s$ inside of the second circuit module. The floating capacitor $C_s$ is charged by both the first capacitor $C_1$ and the second capacitor $C_2$ simultaneously. The second circuit module $M_{22}$ outputs four mutually different voltage levels.

Figure 17:
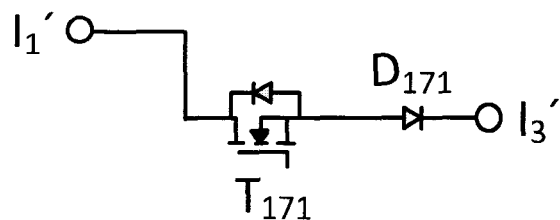
FIG. 17 is the first circuit diagram of the first circuit module $M_{21}$ for the second kind of single phase four-level inverter topology unit according to an embodiment of the invention.
Figure 17:
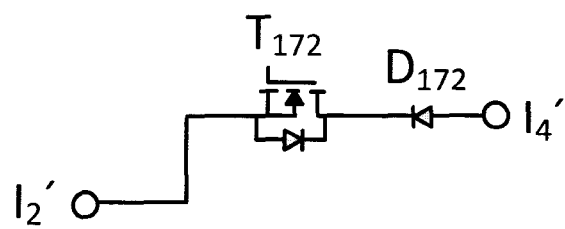

FIG. 17 shows the first circuit diagram of the first circuit module $M_{21}$ for the second kind of single phase four-level inverter topology unit according to an embodiment of the invention. The first circuit module $M_{21}$ comprises a first bidirectional switch $T_{171}$, a second bidirectional switch $T_{172}$, a first diode $D_{171}$ and a second diode $D_{172}$.

The first terminal of the first bidirectional switch $T_{171}$ is connected to the first terminal $I_1'$ of the first circuit module $M_{21}$ and the second terminal of the first bidirectional switch $T_{171}$ is connected to the positive terminal of the first diode $D_{171}$ whose negative terminal is connected to the third terminal $I_3'$ of the first circuit module $M_{21}$. The second terminal of the second bidirectional switch $T_{172}$ is connected to the second terminal $I_2'$ of the first circuit module $M_{21}$ and the first terminal of the second bidirectional switch $T_{172}$ is connected to the negative terminal of the second diode $D_{172}$ whose positive terminal is connected to the fourth terminal $I_4'$ of the first circuit module $M_{21}$.

Figure 18:
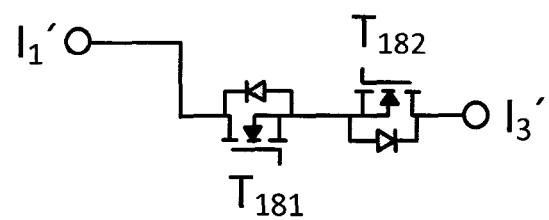
FIG. 18 is the second circuit diagram of the first circuit module $M_{21}$ for the second kind of single phase four-level inverter topology unit according to an embodiment of the invention.
Figure 18:
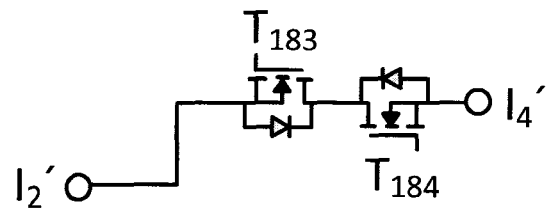

FIG. 18 shows the second circuit diagram of the first circuit module $M_{21}$ for the second kind of single phase four-level inverter topology unit according to an embodiment of the invention. The first circuit module $M_{21}$ comprises a first bidirectional switch $T_{181}$, a second bidirectional switch $T_{182}$, a third bidirectional switch $T_{183}$ and a fourth bidirectional switch $T_{184}$.

The first terminal of the first bidirectional switch $T_{181}$ is connected to the first terminal $I_1'$ of the first circuit module $M_{21}$ and the second terminal of the first bidirectional switch $T_{181}$ is connected to the second terminal of the second bidirectional switch $T_{182}$ whose first terminal is connected to the third terminal $I_3'$ of the first circuit module $M_{21}$. The second terminal of the third bidirectional switch $T_{183}$ is connected to the second terminal $I_2'$ of the first circuit module $M_{21}$ and the first terminal of the third bidirectional switch $T_{183}$ is connected to the first terminal of the fourth bidirectional switch $T_{184}$ whose second terminal is connected to the fourth terminal $I_4'$ of the first circuit module $M_{21}$.

Figure 19:
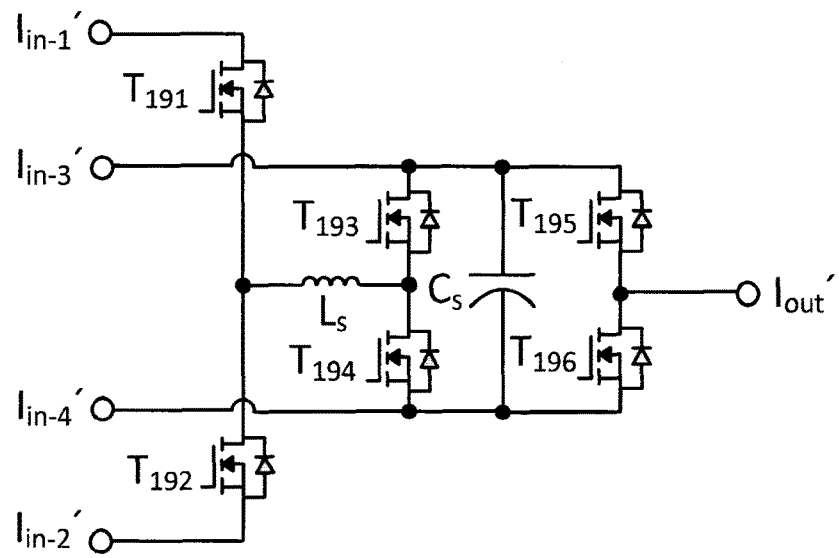
FIG. 19 is the circuit diagram of the second circuit module $M_{22}$ for the second kind of single phase four-level inverter topology unit according to an embodiment of the invention.

FIG. 19 shows a circuit diagram of the second circuit module $M_{22}$ for the second kind of single phase four-level inverter topology unit according to an embodiment of the invention. The second circuit module $M_{22}$ comprises the current-limiting inductor $L_s$, the floating capacitor $C_s$, a first bidirectional switch $T_{191}$, a second bidirectional switch $T_{192}$, a third bidirectional switch $T_{193}$, a fourth bidirectional switch $T_{194}$, a fifth bidirectional switch $T_{195}$ and a sixth bidirectional switch $T_{196}$.

The first terminal of the first bidirectional switch $T_{191}$ is connected to the first input terminal $I_{in\text{-}1}'$ of the second circuit module $M_{22}$ and the second terminal of the first bidirectional switch $T_{191}$ is connected to the first terminal of the second bidirectional switch $T_{192}$ whose second terminal is connected to the second input terminal $I_{in\text{-}2}'$ of the second circuit module $M_{22}$. The first terminal of the third bidirectional switch $T_{193}$ is connected to both the third input terminal $I_{in\text{-}3}'$ of the second circuit module $M_{22}$ and the positive terminal of the floating capacitor $C_s$, and the second terminal of the third bidirectional switch $T_{193}$ is connected to the first terminal of the fourth bidirectional switch $T_{194}$ whose second terminal is connected to both the fourth input terminal $I_{in\text{-}4}'$ of the second circuit module $M_{22}$ and the negative terminal of the floating capacitor $C_s$. The current-limiting inductor $L_s$ is connected between the first terminal of the second bidirectional switch $T_{192}$ and the first terminal of the fourth bidirectional switch $T_{194}$. The first terminal of the fifth bidirectional switch $T_{195}$ is connected to the positive terminal of the floating capacitor $C_s$ and the second terminal of the fifth bidirectional switch $T_{195}$ is connected to the first terminal of the sixth bidirectional switch $T_{196}$ whose second terminal is connected to the negative terminal of the floating capacitor $C_s$. The common terminal of the fifth bidirectional switch $T_{195}$ and the sixth bidirectional switch $T_{196}$ is connected to the output terminal $I_{out}'$ of the second circuit module $M_{22}$.

Figure 20:
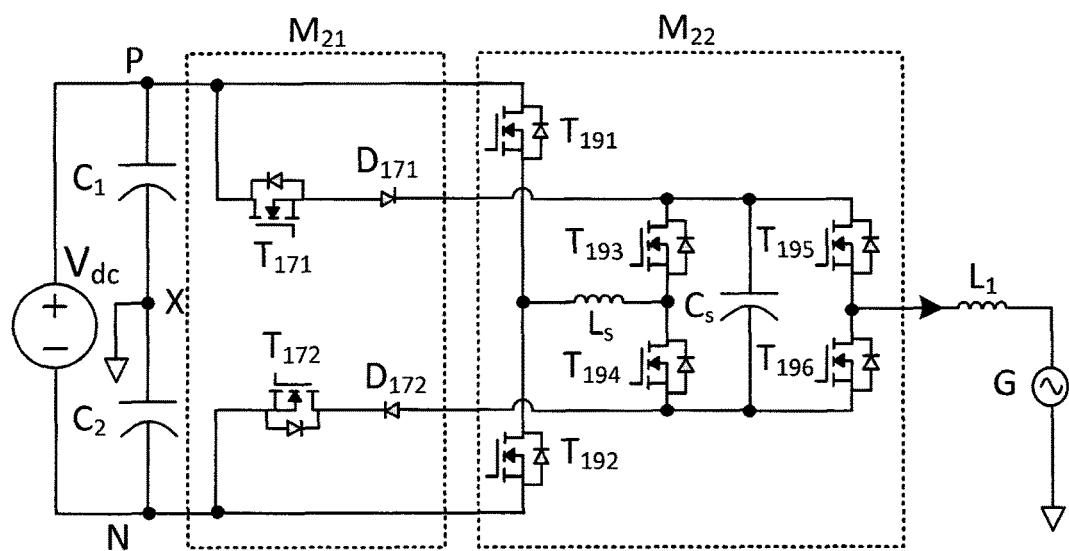
FIG. 20 is the circuit diagram of the second kind of single phase four-level inverter with both the first circuit module $M_{21}$ shown in FIG. 17 and the second circuit module $M_{22}$ shown in FIG. 19 according to an embodiment of the invention.

FIG. 20 shows the second kind of single phase four-level inverter with both the first circuit module $M_{21}$ shown in FIG. 17 and the second circuit module $M_{22}$ shown in FIG. 19.

The operational principles of the second kind of single phase four-level inverter are similar to those of the first kind of single phase four-level inverter. Similar analysis about operational modes is easily made for the second kind with reference of that of the first kind. For the sake of brevity, it is not described here.

However, there is no free-wheeling loop circuit in need for the current limiting inductor $L_s$ as it works as either a current-limiting device or a filtering inductor in the second kind of single phase four-level inverter. The term $V_{Ls}$ is used to refer to the voltage on the current limiting inductor $L_s$ when the current flows from left to right in the accompanied drawings. Since the current limiting inductor $L_s$ works as part of the loop circuit where the output voltage Uox from the inverter is located, the voltage VLs or minus the voltage VLs is added in order to get the output voltage Uox. The inductance of the current limiting inductor $L_s$ is so small that the voltage $V_{Ls}$ can even be ignored.

Figure 21:
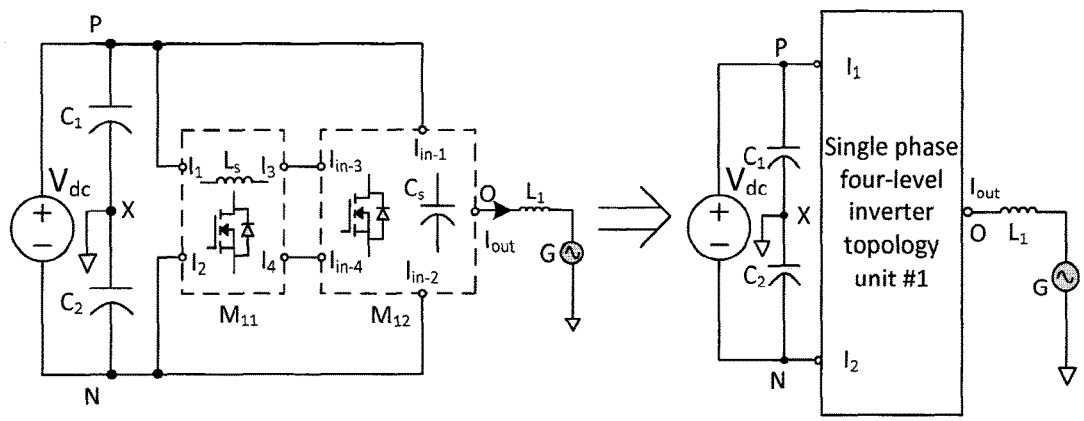
FIG. 21 (a) is an equivalent block circuit diagram of the first kind of single phase four-level inverter topology unit according to an embodiment of the invention.
Figure 21:
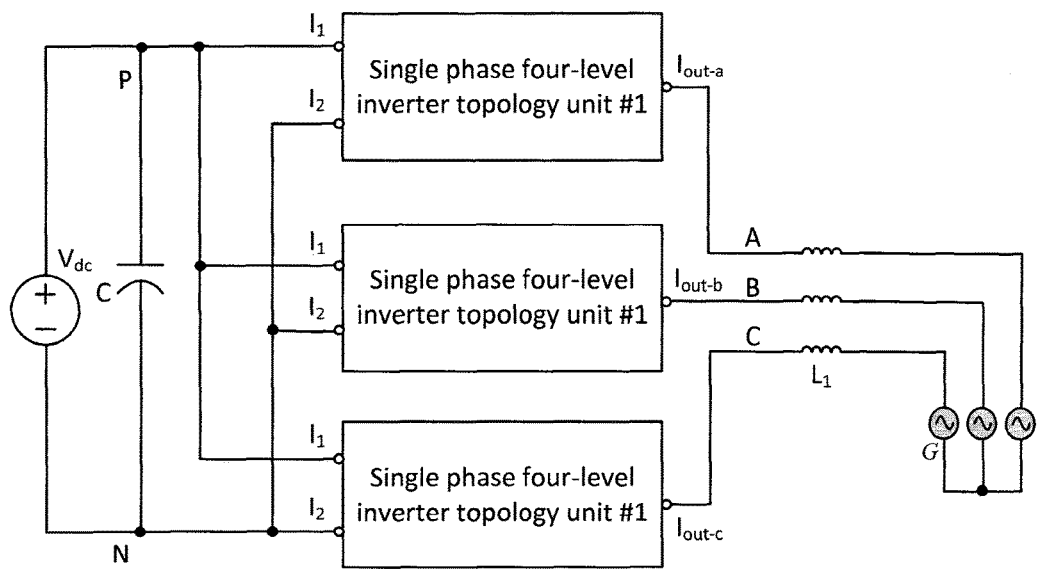

FIG. 21(*a*) shows an equivalent block circuit diagram of the first kind of single phase four-level inverter topology unit. As shown in FIG. 21(*a*), the first terminal $I_1$ of the first circuit module $M_{11}$ is defined as the first DC input terminal of the first kind of single phase four-level inverter topology unit, the second terminal $I_2$ of the first circuit module $M_{11}$ is defined as the second DC input terminal, and the output terminal $I_{out}$ of the second circuit module $M_{12}$ is defined as the AC output terminal.

FIG. 21(*b*) is the circuit diagram in partial block form of a first kind of three-phase four-level inverter topology based on the equivalent circuit in FIG. 21(*a*). As shown in FIG. 21(*b*), it comprises three of the first kind of single phase four-level inverter topology units. The three single phase four-level inverter topology units are connected in parallel with one DC power supply at their input sides. That is to say, all the first DC input terminals are connected to the positive terminal of the DC power supply; all the second DC input terminals are connected to the negative terminal of the DC power supply; and all the AC output terminals of the three single phase four-level inverter topology units are respectively connected to three phases of AC utilities or AC load.

Figure 22:
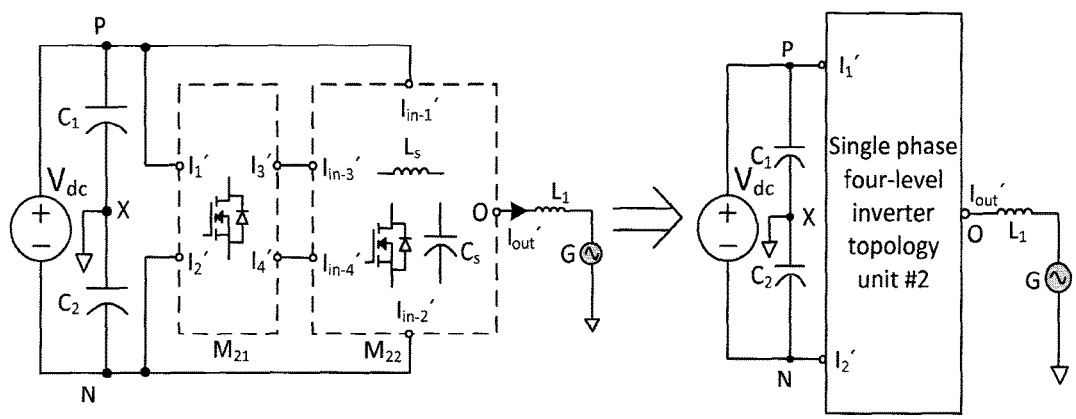
FIG. 22 (a) is an equivalent block circuit diagram of the second kind of single phase four-level inverter topology unit according to an embodiment of the invention.
Figure 22:
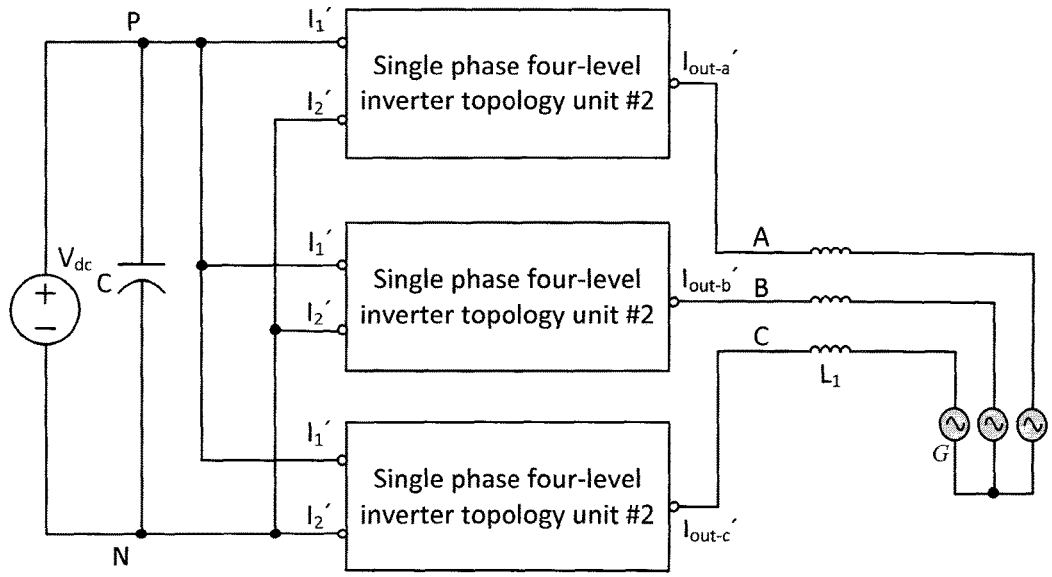

FIG. 22(*a*) shows an equivalent block circuit diagram of the second kind of single phase four-level inverter topology unit. As shown in FIG. 22(*a*), the first terminal $I_1'$ of the first circuit module $M_{21}$ is defined as the first DC input terminal of the second kind of single phase four-level inverter topology unit, the second terminal $I_2'$ of the first circuit module $M_{21}$ is defined as the second DC input terminal, and the output terminal $I_{out}'$ of the second circuit module $M_{22}$ is defined as the AC output terminal.

FIG. 22(*b*) is the circuit diagram in partial block form of a second kind of three-phase four-level inverter topology based on the equivalent circuit in FIG. 22(*a*). As shown in FIG. 22(*b*), it comprises three of the second kind of single phase four-level inverter topology units. The three single phase four-level inverter topology units are connected in parallel with one DC power supply at their input sides. That is to say, all the first DC input terminals are connected to the positive terminal of the DC power supply; all the second DC input terminals are connected to the negative terminal of the DC power supply; and all the AC output terminals of the three single phase four-level inverter topology units are respectively connected to three phases of AC utilities or AC load.

Figure 23:
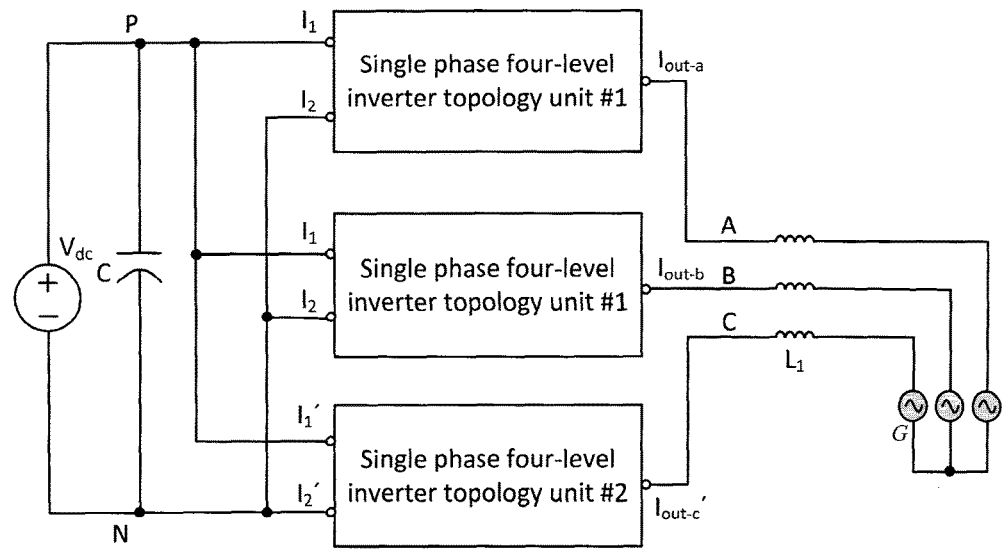
FIG. 23 (a) is the circuit diagram in block form of a first three-phase four-level inverter topology based on the equivalent circuit in FIG. 21(a) and FIG. 22(a) according to an embodiment of the invention.
Figure 23:
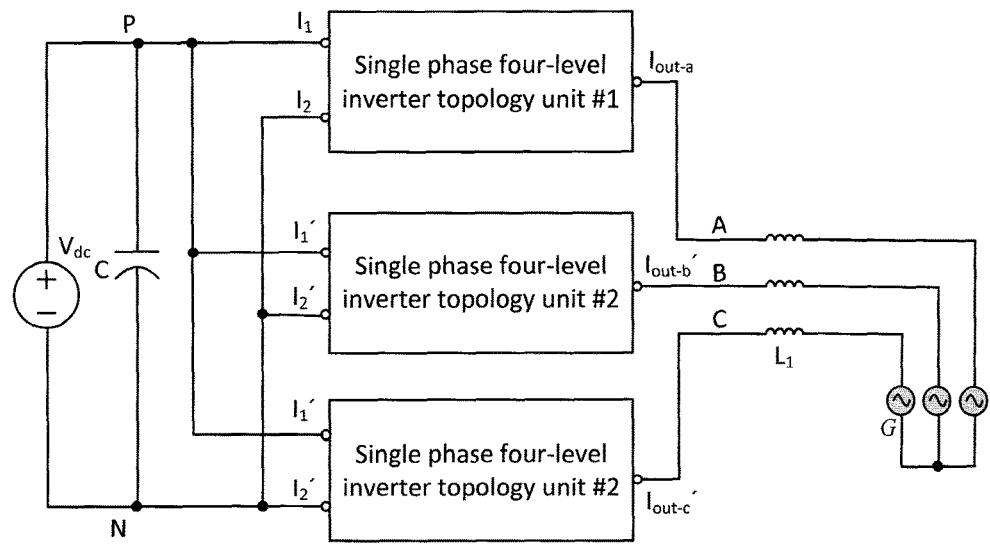

FIG. 23(*a*) is the circuit diagram in partial block form of a third kind of three-phase four-level inverter topology based on the equivalent circuit in FIG. 21(*a*) and FIG. 22(*a*). As shown in FIG. 23(*a*), it comprises two of the first kind of single phase four-level inverter topology units and one of the second kind of single phase four-level inverter topology unit. The three single phase four-level inverter topology units are connected in parallel with one DC power supply at their input sides. That is to say, all the first DC input terminals are connected to the positive terminal of the DC power supply; all the second DC input terminals are connected to the negative terminal of the DC power supply; and all the AC output terminals of the three single phase four-level inverter topology units are respectively connected to three phases of AC utilities or AC load.

FIG. 23(*b*) is the circuit diagram in partial block form of a third kind of three-phase four-level inverter topology based on the equivalent circuit in FIG. 21(*a*) and FIG. 22(*a*). As shown in FIG. 23(*b*), it comprises one of the first kind of single phase four-level inverter topology unit and two of the second kind of single phase four-level inverter topology units. The three single phase four-level inverter topology units are connected in parallel with one DC power supply at their input sides. That is to say, all the first DC input terminals are connected to the positive terminal of the DC power supply; all the second DC input terminals are connected to the negative terminal of the DC power supply; and all the AC output terminals of the three single phase four-level inverter topology units are respectively connected to three phases of AC utilities or AC load.

The first circuit module $M_{11}$ in the three-phase four-level inverter topology in from FIG. 21(*b*) to FIG. 23(*b*) can employ any one shown in from FIG. 4 to FIG. 6, and the second circuit module $M_{12}$ can employ the one shown in FIG. 7 or FIG. 8. Similarly, the first circuit module $M_{21}$ in the three-phase four-level inverter topology in from FIG. 21(b) to FIG. 23(b) can employ the one shown in FIG. 17 or FIG. 18, and the second circuit module $M_{22}$ can employ the one shown in FIG. 19. The circuit modules marked with the same symbols with the same circuits are preferred as it is more flexible from manufacturing point of view. For example, each of the first circuit module $M_{11}$ employ the one shown in FIG. 4, and each of the second circuit module $M_{12}$ employ the one shown in FIG. 7.

The four-level inverter topology provided in the invention can be used for, but not limited to, renewable energy power system, such as single-phase or three-phase photovoltaic system, as well as three-phase motor drive.

Each embodiment in the part of the detailed description of the embodiments goes forward one by one. The differences among the embodiments are focused on, and the same or similar among all the embodiments is easy to be understood by making a cross-reference.

Note that the relationship terms like "first", "second" and so on are used in the invention just for the sake of description and not to indicate any real relationship or sequence among them.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A four-level inverter topology unit, comprising:
first and second input terminals that receive a DC input voltage $V_{DC}$;
first and second DC power supplies connected together in series between the first and second input terminals;
a circuit common point between the first and second DC power supplies;
at least a floating capacitor and circuit branches from both the first DC power supply and the second DC power supply to the floating capacitor, wherein a floating capacitor voltage is $V_{CS}$;
an AC output terminal that provides AC output power to a load connected between the AC output terminal and the circuit common point;
wherein the floating capacitor is charged by the first and second DC power supplies simultaneously;
wherein the first DC power supply voltage is $+V_{DC}/2$, and the second DC power supply voltage is $-V_{DC}/2$;
wherein the four-level inverter topology unit produces four mutually different output voltage levels corresponding to the first DC power supply voltage ($+V_{DC}/2$), the second DC power supply voltage ($-V_{dc}/2$), the first DC power supply added to the floating capacitor voltage ($+V_{DC}/2+V_{CS}$), and a negative voltage corresponding to the floating capacitor voltage subtracted from the second DC power supply voltage ($-V_{DC}/2-V_{CS}$).

2. The four-level inverter topology unit of claim 1, further comprising a current limiting device selected from an inductor, a resistor, a semiconductor device operated at active mode or linear mode, and a combination thereof.

3. The four-level inverter topology unit of claim 2, wherein the current limiting device comprises a current-limiting inductor.

4. The four-level inverter topology unit of claim 1, wherein the first and second DC power supplies comprise first and second capacitors connected together in series; wherein the first and second capacitors function as DC power supplies.

5. The four-level inverter topology unit of claim 1, further comprises a first circuit module and a second circuit module which has input terminals connected to the first circuit module; wherein the second circuit module comprises the floating capacitor;
the first circuit module provides at least two circuit branches: one circuit branch is connected between the first DC power supply and one input terminal of the second circuit module, and the other is connected between the second DC power supply and another input terminal of the second circuit module;
the two circuit branches are extended to the floating capacitor inside of the second circuit module;
the second circuit module produces four mutually different voltage levels.

6. The four-level inverter topology unit of claim 5, wherein the first circuit module comprises a first terminal, a second terminal, a third terminal and a fourth terminal;
there is at least one circuit branch between the first terminal and the third terminal, and between the second terminal and the fourth terminal;
the first terminal of the first circuit module is connected to the positive terminal of the first DC power supply, and the second terminal of the first circuit module is connected to the negative terminal of the second DC power supply;
the second circuit module comprises a first input terminal, a second input terminal, a third input terminal, a fourth input terminal and an output terminal;
there is at least one circuit branch between each of the input terminals and the output terminal;
the third terminal of the first circuit module is connected to the third input terminal of the second circuit module and the fourth terminal of the first circuit module is connected to the fourth input terminal of the second circuit module;
the first input terminal of the second circuit module is connected to the positive terminal of the first DC power supply and the second input terminal of the second circuit module is connected to the negative terminal of the second DC power supply;
the output terminal of the second circuit module is connected to a first terminal of AC utilities or AC load.

7. The four-level inverter topology unit of claim 6, wherein the circuit branch which is connected between the first terminal and the third terminal of the first circuit module or between the second terminal and the fourth terminal of the first circuit module comprises at least one bidirectional switch.

8. The four-level inverter topology unit of claim 7, wherein the circuit common point of the two DC power supplies is connected to a second terminal of an AC utility or an AC load.

9. The four-level inverter topology unit of claim 8, wherein the second circuit module is connected to a filtering inductor which is connected between the output terminal of the second circuit module and the first terminal of AC utilities or AC load.

10. The four-level inverter topology unit of claim 8, wherein the first circuit module further comprises a current limiting device selected from an inductor, a resistor, a semiconductor device operated at active mode or linear mode, and a combination of the above devices.

11. The four-level inverter topology unit of claim 10, wherein the current limiting device is comprised of a current-limiting inductor.

12. The four-level inverter topology unit of claim 11, wherein the first circuit module further comprises a first bidirectional switch, a second bidirectional switch, a first diode and a second diode;
the first terminal of the first bidirectional switch is connected with the first terminal of the first circuit module and the second terminal of the first bidirectional switch is connected with the first terminal of the second bidirectional switch whose second terminal is connected to the second terminal of the first circuit module;
the positive terminal of the first diode is connected with the negative terminal of the second diode, and the negative terminal of the first diode is connected with the third terminal of the first circuit module; the positive terminal of the second diode is connected with the fourth terminal of the first circuit module;
the current-limiting inductor is connected between the first terminal of the second bidirectional switch and the positive terminal of the first diode.

13. The four-level inverter topology unit of claim 11, wherein the first circuit module further comprises a first bidirectional switch, a second bidirectional switch, a third bidirectional switch, and a fourth bidirectional switch;
the first terminal of the first bidirectional switch is connected with the first terminal of the first circuit module and the second terminal of the first bidirectional switch is connected with the first terminal of the second bidirectional switch whose second terminal is connected to the second terminal of the first circuit module;
the first terminal of the third bidirectional switch is connected with the third terminal of the first circuit module and the second terminal of the third bidirectional switch is connected with the first terminal of the fourth bidirectional switch whose second terminal is connected to the fourth terminal of the first circuit module;
the current-limiting inductor is connected between the first terminal of the second bidirectional switch and the first terminal of the fourth bidirectional switch.

14. The four-level inverter topology unit of claim 11, wherein the first circuit module further comprises a first bidirectional switch, a second bidirectional switch, a third bidirectional switch, a fourth bidirectional switch, a first diode, a second diode, a first current-limiting inductor and a second current-limiting inductor;
the first terminal of the first bidirectional switch is connected with both the first terminal of the first circuit module and a first terminal of the first current-limiting inductor, and the second terminal of the first bidirectional switch is connected with a first terminal of the second current-limiting inductor whose second terminal is connected to the second terminal of the first circuit module;
a second terminal of the first current-limiting inductor is connected to the first terminal of the second bidirectional switch whose second terminal is connected to the second terminal of the first circuit module;
the first terminal of the third bidirectional switch is connected with the second terminal of the first current-limiting inductor and the second terminal of the third bidirectional switch is connected with the positive terminal of the first diode whose negative terminal is connected to the third terminal of the first circuit module;

the second terminal of the fourth bidirectional switch is connected to the first terminal of the second current-limiting inductor and the first terminal of the fourth bidirectional switch is connected to the negative terminal of the second diode whose positive terminal is connected to the fourth terminal of the first circuit module.

15. The four-level inverter topology unit of claim 11, wherein the second circuit module further comprises a first bidirectional switch, a second bidirectional switch, a third bidirectional switch, a fourth bidirectional switch, a fifth bidirectional switch and a sixth bidirectional switch;
the first terminal of the first bidirectional switch is connected to the first input terminal of the second circuit module and the second terminal of the first bidirectional switch is connected to the first terminal of the second bidirectional switch whose second terminal is connected to the second input terminal of the second circuit module;
the first terminal of the third bidirectional switch is connected to both the third input terminal of the second circuit module and the positive terminal of the floating capacitor;
the second terminal of the third bidirectional switch is connected to the first terminal of the fourth bidirectional switch whose second terminal is connected to both the fourth input terminal of the second circuit module and the negative terminal of the floating capacitor;
the common terminal of the third and the fourth bidirectional switches is connected to the common terminal of the first and the second bidirectional switches;
the first terminal of the fifth bidirectional switch is connected to the positive terminal of the floating capacitor and the second terminal is connected to the first terminal of the sixth bidirectional switch whose second terminal is connected to the negative terminal of the floating capacitor;
the common terminal of the fifth and the sixth bidirectional switches is connected to the output terminal of the second circuit module.

16. The four-level inverter topology unit of claim 11, wherein the second circuit module further comprises a first diode, a second diode, a first bidirectional switch, a second bidirectional switch, a third bidirectional switch, a fourth bidirectional switch, a fifth bidirectional switch and a sixth bidirectional switch;
the first terminal of the first bidirectional switch is connected to the first input terminal of the second circuit module and the second terminal of the first bidirectional switch is connected to both the fourth input terminal of the second circuit module and the negative terminal of the floating capacitor;
the first terminal of the second bidirectional switch is connected to both the third input terminal of the second circuit module and the positive terminal of the floating capacitor and the second terminal of the second bidirectional switch is connected to the second input terminal of the second circuit module;
the positive terminal of the first diode is connected to the first input terminal of the second circuit module and the negative terminal of the first diode is connected to the first terminal of the third bidirectional switch whose second terminal is connected to both the first terminal of the fourth bidirectional switch and the third input terminal of the second circuit module;

the second terminal of the fourth bidirectional switch is connected to the first terminal of the fifth bidirectional switch whose second terminal is connected to both the first terminal of the sixth bidirectional switch and the fourth input terminal of the second circuit module;

the second terminal of the sixth bidirectional switch is connected to the positive terminal of the second diode whose negative terminal is connected to the second input terminal of the second circuit module;

the common terminal of the fourth and the fifth bidirectional switches is connected to the output terminal of the second circuit module.

17. The four-level inverter topology unit of claim 8, wherein the second circuit module further comprises a current limiting device selected from an inductor, a resistor, a semiconductor device operated at active mode or linear mode, and a combination of the above devices.

18. The four-level inverter topology unit of claim 17, wherein the current limiting device is comprised of a current-limiting inductor.

19. The four-level inverter topology unit of claim 18, wherein the first circuit module further comprises a first bidirectional switch, a second bidirectional switch, a first diode and a second diode;

the first terminal of the first bidirectional switch is connected to the first terminal of the first circuit module and the second terminal of the first bidirectional switch is connected to the positive terminal of the first diode whose negative terminal is connected to the third terminal of the first circuit module;

the second terminal of the second bidirectional switch is connected to the second terminal of the first circuit module and the first terminal of the second bidirectional switch is connected to the negative terminal of the second diode whose positive terminal is connected to the fourth terminal of the first circuit module.

20. The four-level inverter topology unit of claim 18, wherein the first circuit module further comprises a first bidirectional switch, a second bidirectional switch, a third bidirectional switch and a fourth bidirectional switch;

the first terminal of the first bidirectional switch is connected to the first terminal of the first circuit module and the second terminal of the first bidirectional switch is connected to the second terminal of the second bidirectional switch whose first terminal is connected to the third terminal of the first circuit module;

the second terminal of the third bidirectional switch is connected to the second terminal of the first circuit module and the first terminal of the third bidirectional switch is connected to the first terminal of the fourth bidirectional switch whose second terminal is connected to the fourth terminal of the first circuit module.

21. The four-level inverter topology unit of claim 18, wherein the second circuit module further comprises a first bidirectional switch, a second bidirectional switch, a third bidirectional switch, a fourth bidirectional switch, a fifth bidirectional switch and a sixth bidirectional switch;

the first terminal of the first bidirectional switch is connected to the first terminal of the second circuit module and the second terminal of the first bidirectional switch is connected to the first terminal of the second bidirectional switch whose second terminal is connected to the second terminal of the second circuit module;

the first terminal of the third bidirectional switch is connected to both the third terminal of the second circuit module and the positive terminal of the floating capacitor, and the second terminal of the third bidirectional switch is connected to the first terminal of the fourth bidirectional switch whose second terminal is connected to both the fourth terminal of the second circuit module and the negative terminal of the floating capacitor;

the current-limiting inductor is connected between the first terminal of the second bidirectional switch and the first terminal of the fourth bidirectional switch;

the first terminal of the fifth bidirectional switch is connected to the positive terminal of the floating capacitor and the second terminal of the fifth bidirectional switch is connected to the first terminal of the sixth bidirectional switch whose second terminal is connected to the negative terminal of the floating capacitor;

the common terminal of the fifth bidirectional switch and the sixth bidirectional switch is connected to the output terminal of the second circuit module.

22. A three-phase four-level inverter topology, comprising three single phase four-level inverter topology units of claim 1;

wherein the three single phase four-level inverter topology units are connected in parallel with one DC input voltage ($V_{DC}$) at their input terminals;

wherein AC output terminals of the three single phase four-level inverter topology units are respectively connected to three phases of an AC utility or an AC load.

23. A three-phase four-level inverter topology, comprising three single phase four-level inverter topology units of claim 10;

wherein the three single phase four-level inverter topology units are connected in parallel with one DC input voltage ($V_{DC}$) at their input terminals;

wherein AC output terminals of the three single phase four-level inverter topology units are respectively connected to three phases of an AC utility or an AC load.

24. The three-phase four-level inverter topology of claim 23, wherein the first circuit modules in the three single phase four-level inverter topology units are the same and the second circuit modules in the three single phase four-level inverter topology units are the same.

* * * * *